United States Patent
Omagari et al.

(10) Patent No.: US 8,792,134 B2
(45) Date of Patent: Jul. 29, 2014

(54) DATA GENERATION METHOD AND DATA GENERATION APPARATUS

(71) Applicant: Canon Kabushiki Kaisha, Tokyo (JP)

(72) Inventors: Yuki Omagari, Tokyo (JP); Mitsuru Uratani, Kawasaki (JP); Yuki Ishida, Kawasaki (JP); Yutaka Hiyama, Yokosuka (JP); Masaaki Obayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 38 days.

(21) Appl. No.: 13/725,639

(22) Filed: Dec. 21, 2012

(65) Prior Publication Data

US 2013/0169994 A1    Jul. 4, 2013

(30) Foreign Application Priority Data

Dec. 28, 2011    (WO) .................. PCT/JP2011/080454

(51) Int. Cl.
- *G06K 15/00* (2006.01)
- *H04N 1/46* (2006.01)
- *G03F 3/08* (2006.01)
- *H04N 1/60* (2006.01)
- *G06K 9/00* (2006.01)

(52) U.S. Cl.
USPC ............. 358/2.1; 358/504; 358/518; 358/1.9; 382/162; 382/167

(58) Field of Classification Search
USPC ............. 358/2.1, 504, 518, 1.9; 382/162, 167
See application file for complete search history.

(56) References Cited

U.S. PATENT DOCUMENTS

| | | | |
|---|---|---|---|
| 7,035,559 B2 * | 4/2006 | Tanaka et al. | 399/49 |
| 7,486,410 B2 * | 2/2009 | Hisamura | 358/1.12 |
| 7,486,414 B2 * | 2/2009 | Arai | 358/1.9 |
| 7,529,006 B2 * | 5/2009 | Itagaki et al. | 358/519 |

FOREIGN PATENT DOCUMENTS

| | | |
|---|---|---|
| JP | 10-28227 A | 1/1998 |
| JP | 2005-45349 A | 2/2005 |
| JP | 2005-123840 A | 5/2005 |
| JP | 2005-348421 A | 12/2005 |
| JP | 2006-237987 A | 9/2006 |
| JP | 2009-137251 A | 6/2009 |
| JP | 2010-93573 A | 4/2010 |
| JP | 2011-166212 A | 8/2011 |

* cited by examiner

*Primary Examiner* — Charlotte M Baker
(74) *Attorney, Agent, or Firm* — Canon USA Inc IP Division

(57) ABSTRACT

Conventional calibration patches are designed such that gradation values of the patches are determined, based on the overall length of a trajectory of a monochrome ink color in an L*a*b* space, so that distances between patches become uniform, and therefore provide low interpolation accuracy in a region where measurement values change non-linearly in accordance with the change in gradation.

According to the present invention, gradation values of patches to be used for color calibration are determined so that the patches are closely arranged in a region where measurement values change non-linearly in accordance with the change in gradation. Thus, interpolation accuracy can be improved in a region where measurement values change non-linearly.

11 Claims, 21 Drawing Sheets

FIG. 6

| GRADATION VALUE n | L* | a* | b* | L*' | a*' | b*' | ΔEn | UNIFORM PATCH |
|---|---|---|---|---|---|---|---|---|
| 0 | 95.819 | 0.495 | −2.524 | 1.000 | 1.000 | 1.000 | 0.068 | 1 |
| 1 | 94.633 | −1.150 | −4.333 | 0.978 | 0.944 | 0.968 | 0.064 | |
| 2 | 93.495 | −2.683 | −6.032 | 0.958 | 0.891 | 0.938 | 0.059 | 2 |
| 3 | 92.434 | −4.084 | −7.606 | 0.938 | 0.843 | 0.910 | 0.055 | |
| 4 | 91.434 | −5.378 | −9.077 | 0.920 | 0.798 | 0.884 | 0.053 | |
| 5 | 90.459 | −6.621 | −10.504 | 0.902 | 0.756 | 0.859 | 0.050 | 3 |
| 6 | 89.520 | −7.798 | −11.872 | 0.885 | 0.715 | 0.835 | 0.047 | |
| 7 | 88.618 | −8.907 | −13.178 | 0.869 | 0.677 | 0.811 | 0.051 | |
| 8 | 87.672 | −10.097 | −14.561 | 0.851 | 0.637 | 0.787 | 0.048 | 4 |
| 9 | 86.757 | −11.228 | −15.888 | 0.835 | 0.598 | 0.764 | 0.046 | |
| 10 | 85.874 | −12.301 | −17.162 | 0.819 | 0.561 | 0.741 | 0.044 | |
| . | . | . | . | . | . | . | . | . |
| . | . | . | . | . | . | . | . | . |
| . | . | . | . | . | . | . | . | . |
| 245 | 41.392 | −11.400 | −58.595 | 0.008 | 0.592 | 0.008 | 0.002 | |
| 246 | 41.350 | −11.343 | −58.581 | 0.007 | 0.594 | 0.008 | 0.002 | |
| 247 | 41.309 | −11.286 | −58.566 | 0.006 | 0.596 | 0.008 | 0.002 | |
| 248 | 41.268 | −11.230 | −58.553 | 0.005 | 0.598 | 0.009 | 0.002 | |
| 249 | 41.227 | −11.173 | −58.539 | 0.005 | 0.600 | 0.009 | 0.002 | |
| 250 | 41.186 | −11.116 | −58.525 | 0.004 | 0.602 | 0.009 | 0.002 | |
| 251 | 41.143 | −11.057 | −58.511 | 0.003 | 0.604 | 0.009 | 0.002 | |
| 252 | 41.099 | −10.998 | −58.497 | 0.002 | 0.606 | 0.010 | 0.002 | |
| 253 | 41.056 | −10.941 | −58.482 | 0.001 | 0.608 | 0.010 | 0.002 | |
| 254 | 41.017 | −10.892 | −58.469 | 0.001 | 0.609 | 0.010 | 0.002 | |
| 255 | 40.978 | −10.842 | −58.474 | 0.000 | 0.611 | 0.010 | 0.000 | 16 |
| TOTAL | | | | | | | 2.248 | |
| ONE PATCH | | | | | | | 0.150 | |

FIG. 9

| PATCH m | GRADATION VALUE BEFORE MODIFICATION | $L^{*'}$ | $a^{*'}$ | $b^{*'}$ | AMOUNT OF DISTORTION $X_m$ | CORRECTION COEFFICIENT $I_n$ |
|---|---|---|---|---|---|---|
| 1 | 0 | 1.000 | 1.000 | 1.000 | 0.000 | 1.000 |
| 2 | 2 | 0.958 | 0.891 | 0.938 | 0.018 | 1.054 |
| 3 | 5 | 0.902 | 0.756 | 0.859 | 0.015 | 1.046 |
| 4 | 8 | 0.851 | 0.637 | 0.787 | 0.010 | 1.030 |
| 5 | 11 | 0.803 | 0.526 | 0.719 | 0.025 | 1.076 |
| 6 | 15 | 0.745 | 0.402 | 0.640 | 0.036 | 1.107 |
| 7 | 19 | 0.694 | 0.301 | 0.571 | 0.058 | 1.174 |
| 8 | 25 | 0.629 | 0.188 | 0.485 | 0.113 | 1.340 |
| 9 | 34 | 0.549 | 0.082 | 0.387 | 0.209 | 1.627 |
| 10 | 46 | 0.467 | 0.015 | 0.292 | 0.451 | 2.354 |
| 11 | 67 | 0.361 | 0.010 | 0.182 | 0.602 | 2.805 |
| 12 | 93 | 0.264 | 0.089 | 0.101 | 0.327 | 1.981 |
| 13 | 121 | 0.184 | 0.207 | 0.048 | 0.179 | 1.537 |
| 14 | 151 | 0.119 | 0.334 | 0.015 | 0.136 | 1.407 |
| 15 | 192 | 0.058 | 0.471 | 0.000 | 0.166 | 1.498 |
| 16 | 255 | 0.000 | 0.611 | 0.010 | 0.166 | 1.498 |

FIG. 11

| GRADATION VALUE | CORRECTION COEFFICIENT $I_n$ | COLOR DIFFERENCE $\Delta E_n'$ | PATCH TO BE MODIFIED |
|---|---|---|---|
| 0 | 1.000 | 0.068 | 1 |
| 1 | 1.032 | 0.066 | |
| 2 | 1.054 | 0.062 | |
| 3 | 1.062 | 0.058 | 2 |
| 4 | 1.057 | 0.056 | |
| 5 | 1.046 | 0.052 | |
| 6 | 1.035 | 0.049 | |
| 7 | 1.028 | 0.052 | 3 |
| 8 | 1.030 | 0.050 | |
| 9 | 1.042 | 0.048 | |
| 10 | 1.059 | 0.047 | |
| . | . | . | . |
| 64 | 2.830 | 0.018 | . |
| . | . | . | . |
| 245 | 1.510 | 0.003 | |
| 246 | 1.509 | 0.003 | |
| 247 | 1.507 | 0.003 | |
| 248 | 1.506 | 0.003 | |
| 249 | 1.505 | 0.003 | |
| 250 | 1.504 | 0.003 | |
| 251 | 1.503 | 0.003 | |
| 252 | 1.501 | 0.003 | |
| 253 | 1.500 | 0.003 | |
| 254 | 1.499 | 0.003 | |
| 255 | 1.498 | 0.000 | 16 |
| TOTAL | | 3.343 | |
| ONE PATCH | | 0.223 | |

FIG. 12

| PATCH NO. | MODIFIED GRADATION VALUE | L* | a* | b* |
|---|---|---|---|---|
| 1 | 0 | 95.819 | 0.495 | −2.524 |
| 2 | 3 | 92.434 | −4.084 | −7.606 |
| 3 | 7 | 88.618 | −8.907 | −13.178 |
| 4 | 12 | 84.195 | −14.288 | −19.566 |
| 5 | 17 | 80.402 | −18.491 | −24.904 |
| 6 | 24 | 76.003 | −22.695 | −30.872 |
| 7 | 32 | 71.962 | −25.720 | −36.080 |
| 8 | 42 | 67.957 | −27.753 | −40.968 |
| 9 | 52 | 64.733 | −28.567 | −44.662 |
| 10 | 64 | 61.491 | −28.500 | −48.056 |
| 11 | 78 | 58.329 | −27.597 | −50.987 |
| 12 | 95 | 55.138 | −25.811 | −53.592 |
| 13 | 120 | 51.227 | −22.750 | −56.247 |
| 14 | 151 | 47.498 | −18.908 | −58.176 |
| 15 | 193 | 44.085 | −14.845 | −59.027 |
| 16 | 255 | 40.978 | −10.842 | −58.474 | ively determined patch gradation values.

DATA GENERATION METHOD AND DATA GENERATION APPARATUS

TECHNICAL FIELD

The present invention relates to a data generation method and a data generation apparatus that generate patch recording data used for color calibration of a recording apparatus which records an image.

BACKGROUND ART

When an image recording apparatus such as a color printer performs printing, variations in color may occur on a printed recording material depending on individual model differences, temporal changes, or environmental conditions such as temperature and humidity. For this reason, for example, in an inkjet printer, the amount of ink to be ejected may be changed in accordance with the environmental conditions described above, and variations in color may occur. In an electrophotographic printer, furthermore, the charge ratio of a photosensitive drum may be changed in accordance with the environmental conditions described above, and variations in color may occur. It is known that, in order to correct such variations in color, parameters in output γ correction processing of a color printer or color conversion processing in color matching and color separation are re-generated and updated to perform color calibration.

Methods have been proposed for obtaining a patch chart, which is printed for such color calibration, with high correction accuracy with a limited number of patches. PTL 1 discloses a method for determining gradation values of patches in a patch chart used for calibration. More specifically, a method is described for calculating the total distance of the trajectory of ink droplets on a CIE-L*a*b* space that is a uniform color space (a sum of ΔE over gradations) and determining a gradation of each patch so that distances between patches of adjacent gradations become uniform.

CITATION LIST

Patent Literature

PTL 1 Japanese Patent Laid-Open No. 2006-237987

However, the method described in PTL 1 has a problem in that a large interpolation error occurs in a specific region when a measurement value of patches is interpolated. The region is a region where the trajectory of measurement values corresponding to the respective gradations for a monochrome ink color is a large curve in the L*a*b* color space and changes non-linearly. That is, if patch gradations are uniformly determined, the measurement values over the respective gradations exhibit large changes in hue, leading to a large interpolation error.

In view of the above problem, the present invention provides a method for determining patch gradation values used to execute color calibration, even when color calibration is performed with a small number of patches, without reducing interpolation accuracy even in a region where measurement values change non-linearly and exhibit large changes in hue.

SUMMARY OF INVENTION

In view of the above problem, the invention according to Claim 1 provides a data generation method for generating patch recording data used to record correction patches corresponding to M (where M is a natural number) gradation values to be used for color calibration, the data generation method including a recording step of recording N patches corresponding to densities of N (where N is a natural number and M<N) gradations; a first calculating step of calculating a correction coefficient for each of L (where L is a natural number and 3≤L≤N) gradation values selected from among the N gradations, by using an absolute value of a difference vector between a unit vector of a first vector and a unit vector of a second vector for three consecutive gradations having, in sequence, a first gradation, a second gradation, and a third gradation among the L gradation values, the unit vector of the first vector and the unit vector of the second vector being calculated based on the first vector and the second vector, the first vector representing a difference between a measurement value of the second gradation and a measurement value of the first gradation by using a plurality of parameters, the second vector representing a difference between a measurement value of the third gradation and the measurement value of the second gradation by using the plurality of parameters; a second calculating step of calculating a correction coefficient for correcting a measurement value, for each of N measurement values on the basis of the L correction coefficients calculated in the first calculating step; a generating step of correcting a color difference of measurement value between gradations of the N gradations by using the N correction coefficients calculated in the second calculating step, and generating N correction values corresponding to the N gradations; and a determining step of determining the M gradation values as gradation values for the correction patches from among the N gradations on the basis of the N correction values.

Further features of the present invention will become apparent from the following description of exemplary embodiments with reference to the attached drawings.

BRIEF DESCRIPTION OF DRAWINGS

FIG. 6 is a diagram illustrating values calculated during the process of determining ΔE uniform patches from measurement values of respective gradations.

FIG. 9 is a diagram illustrating values calculated during the process of determining a correction coefficient $I_n$ from a measurement value of a ΔE uniform patch.

FIG. 11 is a diagram illustrating values calculated during the process of determining a patch to be modified.

FIG. 12 is a diagram illustrating modified gradation values and L*a*b* values.

DESCRIPTION OF EMBODIMENTS

Embodiments of the present invention will be described in detail hereinafter with reference to the drawings.

Embodiment 1

Schematic Configuration of System

Figure 1:
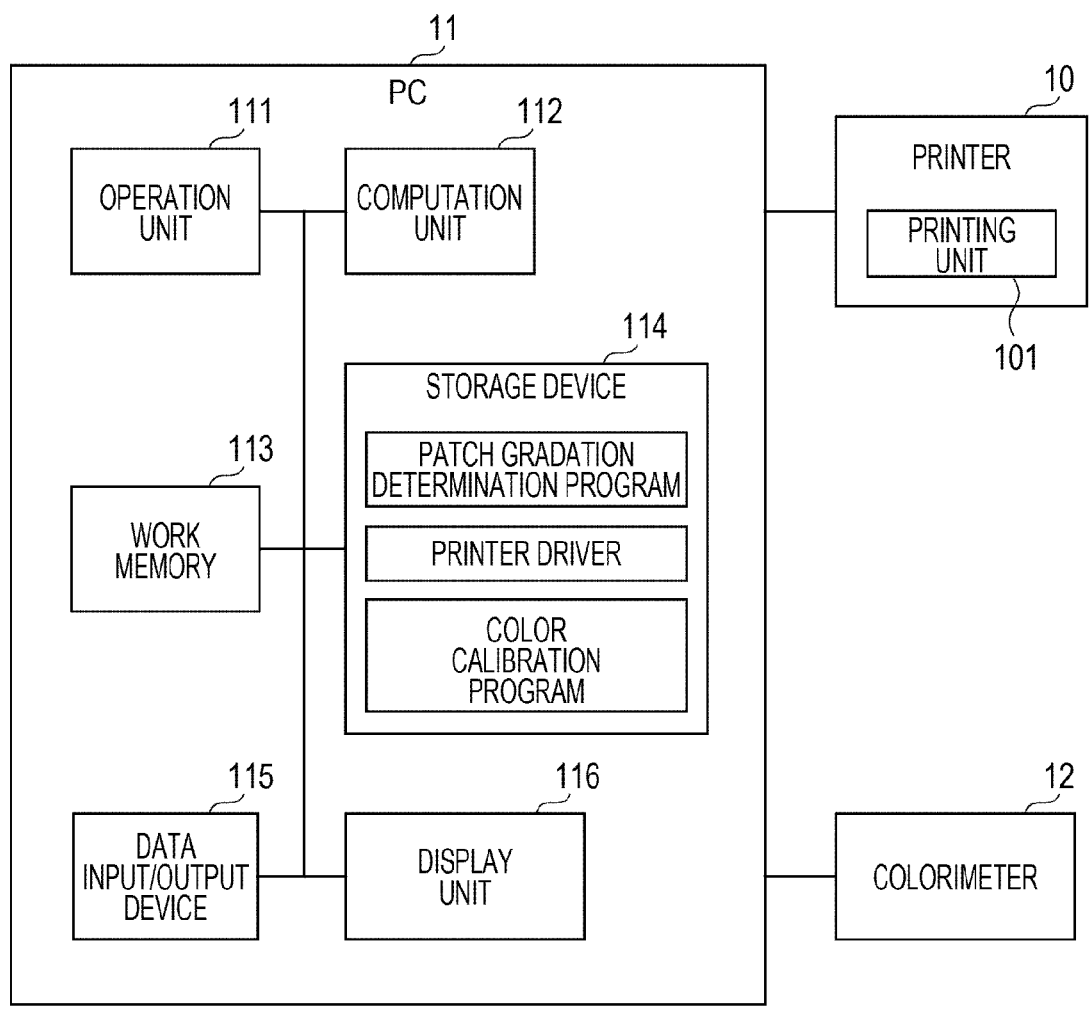
FIG. 1 is a diagram depicting a control configuration of a printing system to which the present invention can be applied.

FIG. 1 is a diagram depicting a control configuration of a printing system for determining patch gradation values for each ink color in color calibration. A personal computer (hereinafter referred to simply as a "PC") 11 which serves as an information processing apparatus and which includes a monitor, a keyboard, a mouse, and a PC body is connected to a printer 10 which serves as a printing apparatus. A colorimeter 12 which serves as a measurement means is further connected to the PC 11. The colorimeter receives reflected light of applied light by using a sensor, measures spectral reflectance from the intensity of the reflected light off a target original, and performs conversion processing for converting the spectral reflectance into L*a*b* values that are values in a CIE-L*a*b* color space which is a uniform-color color space. In this embodiment, the printer 10 is implemented using an inkjet printer, by way of example, or may be, for example, an electrophotographic printer.

Figure 14:
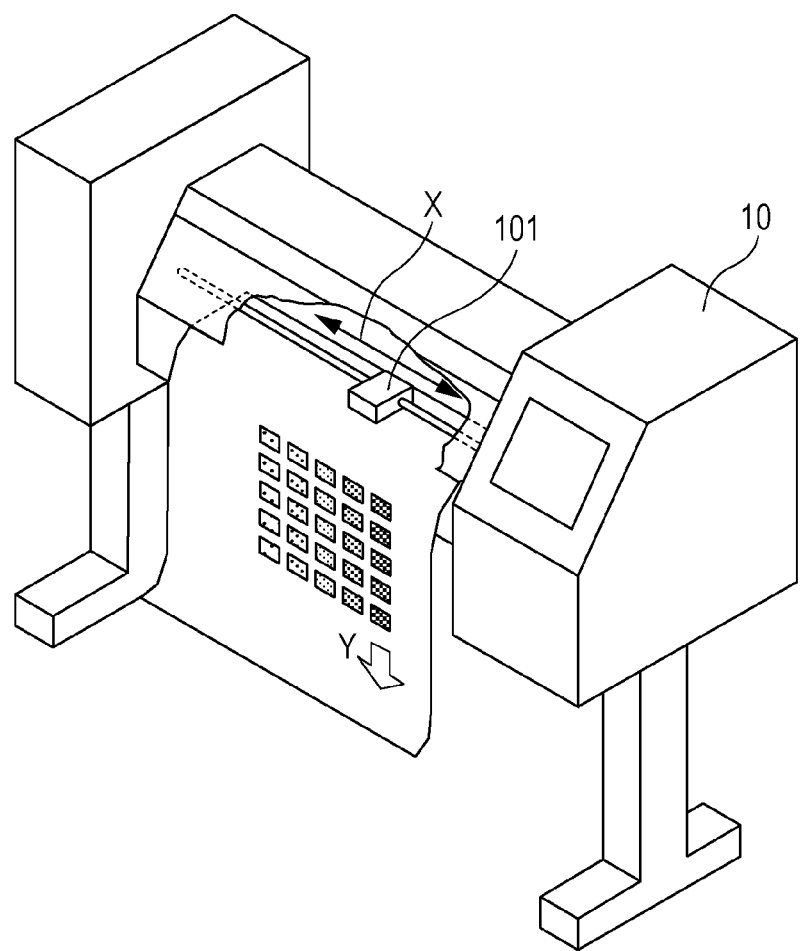
FIG. 14 is a diagram illustrating an overview of a printer.

FIG. 14 is a diagram illustrating an overview of the printer 10. A printing unit 101 of the printer 10 includes a carriage and a print head. The printing unit 101 records an image by ejecting ink supplied from an ink tank (not illustrated) to the print head onto a surface of a recording medium while moving (scanning) the carriage in the X direction in the drawing and conveying the recording medium in the Y direction in the drawing.

The PC 11 performs various kinds of processing in order to control the printer 10 and the colorimeter 12. The PC 11 includes an operation unit 111, a computation unit 112, a work memory 113, a storage device 114, a data input/output device 115, and a display unit 116. The operation unit 111, which serves as a user interface (hereinafter referred to as a UI), includes an input and I/F device such as a keyboard and a mouse. The display unit 116 is a display device such as a display. The storage device 114 is a storage device such as a hard disk, and stores a program for determining patch gradation values described below, a program for executing color calibration, printing data created by the PC 11, and applications such as a printer driver. In an embodiment of the present invention the storage device is a non-transitory computer readable medium. Aspects of an embodiment of the present invention may be encoded on the non-transitory computer readable medium. The computation unit 112 executes processing for controlling the printer 10 and the colorimeter 12 in accordance with the program stored in the storage device 114. The work memory 113 is used as a work area when the processing is executed.

In general, documents and images processed by various applications in the PC 11 can be output by the printer 10 through a printer driver. For example, predetermined image processing is performed on an image or the like processed by a printing application in the PC 11 to produce printing data, and the printing data is delivered to a printer driver. The printer driver performs color conversion on the printing data to obtain ink colors (for example, CMYK) to be used in a printer, and further performs halftone processing before outputting the printing data to the printer 10. The printer 10 outputs data subjected to halftone processing, which has been received from the PC 11, onto a recording medium. Further, the PC 11 is capable of controlling the colorimeter 12, and can execute measurement processing to acquire a measurement result of the recording material on which the printer 10 has performed recording.

Color Calibration

In an image recording apparatus such as a printer that outputs a color image, variations in color may occur on a recording material depending on individual model differences, temporal changes, or environmental conditions such as temperature and humidity. In order to correct such variations, color calibration needs to be executed.

Figure 2:
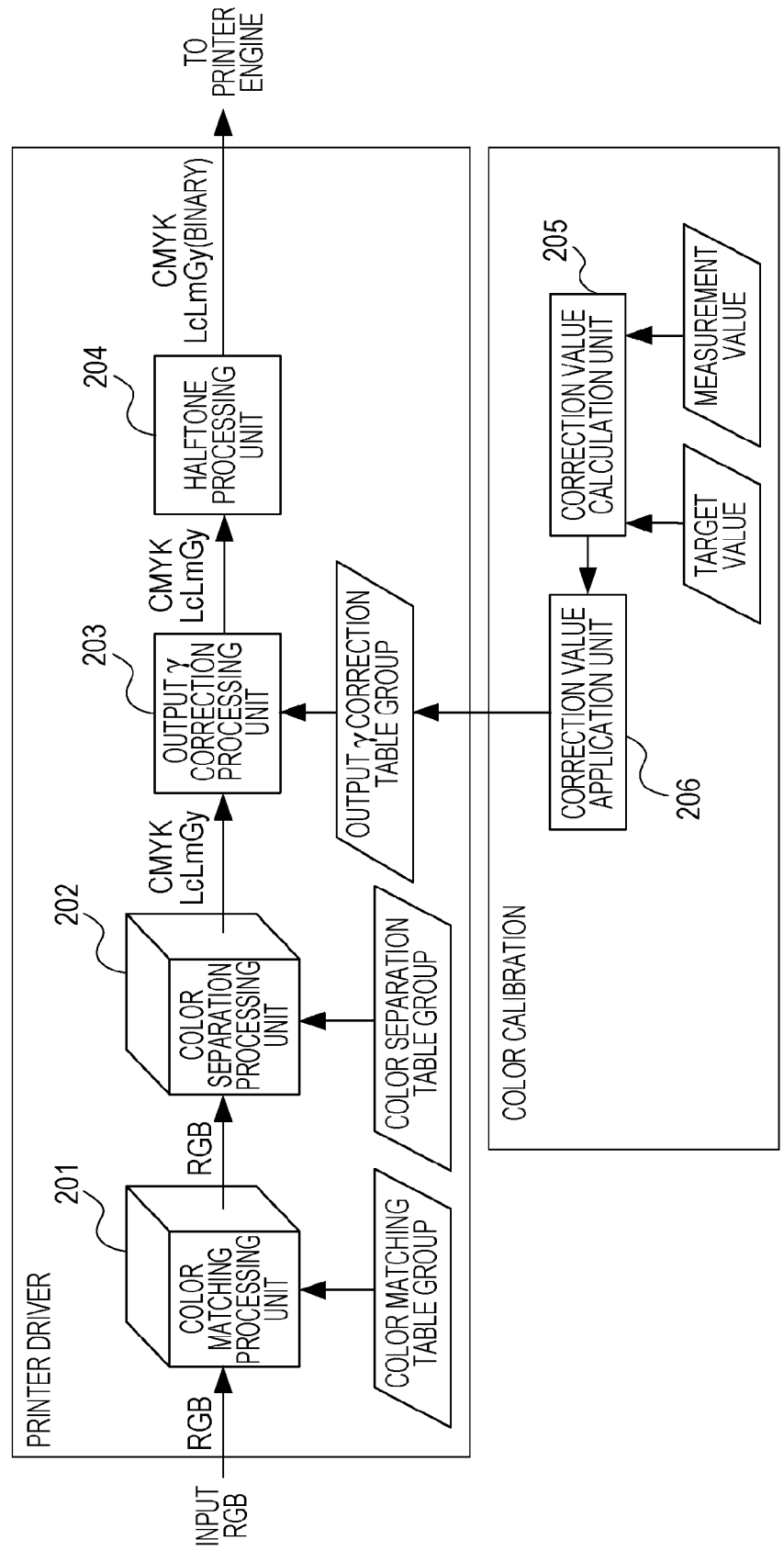
FIG. 2 is a diagram illustrating a printing processing flow in a recording apparatus.

FIG. 2 is a diagram depicting a flow of printing processing performed in an inkjet printer having a color calibration function. The printing processing is executed using a printer driver and a color calibration program which are saved in the storage device 114 in FIG. 1. A color matching processing unit 201 performs processing for converting input RGB values into RGB values unique to the apparatus, by using a three-dimensional lookup table (hereinafter, 3D-LUT). A color separation processing unit 202 performs processing for converting the RGB values unique to the apparatus into signal values corresponding to ink colors used in the printer, by using the 3D-LUT. An output γ correction processing unit 203 performs output γ correction processing on a signal value of each ink color, by using an output γ correction table that is a one-dimensional lookup table (1D-LUT). The corrected signal value corresponding to each ink color is binarized by a well-known binarizing means in a halftone processing unit 204, and the binarized values are delivered to a printer engine as data for printing. In this embodiment, the PC 11 performs color conversion processing, halftone processing, and color calibration processing; however, the color conversion processing, the halftone processing, and the color calibration processing may be executed in the printer 10.

The claimed invention is an invention which relates to a data generation method for generating data of a color calibration chart used for color calibration processing. To this end, gradation values of patches to be printed on the chart need to be determined. First, as a preliminary step, a patch chart (correction patch chart) is printed using the printing unit 101. The patch chart includes a plurality of correction patches for each ink color, and the plurality of patches respectively correspond to a plurality of gradation values. A gradation value of each patch is a gradation value determined using a method described below. Next, the patch chart is subjected to color measurement using the colorimeter 12. Values obtained through color measurement (measurement values) are stored in the storage device 114 using predetermined form. Then, a correction value calculation unit 205 calculates correction values from target values (in this embodiment, L*a*b* values) that are stored in a storage device in advance and that indicate target colors and from measurement values obtained by subjecting the patch chart to color measurement. Further, a one-dimensional correction LUT for obtaining target characteristics is generated based on the calculated correction values. The output γ correction table to be used in the output γ correction processing unit 203 described with reference to FIG. 2 is corrected using the correction LUT. In this way, output γ correction processing to which color calibration is applied can be performed on image data. The processing for correcting the output γ correction table is performed by a correction application unit 206 by inputting output values included in an output γ correction table obtained before correction to the correction LUT and by using values that have been output as output values in an output γ correction table obtained after correction. That is, the corrected output γ correction table is a table in which values obtained by applying the correction LUT to output values in the output γ table obtained before correction are used as output values with respect to input values in the output γ table obtained before correction. With the use of the table, the output γ correction processing unit 203 can execute output γ correction processing, to which color calibration is applied, on image data.

Determination of Patch Gradation Values

Next, a method for determining a gradation value of each patch in a patch chart used for color calibration, which is a feature of the present invention, will be described using FIGS. 3 to 12 and 13A to 13C. The processing for determining a gradation value of each patch in a patch chart is performed by starting the program stored in the storage device 114 for determining patch gradation values and by executing the program.

Here, the previously-described method described in PTL 1 will be described as a comparative example. PTL 1 describes that patch gradation values are selected based on the sum of the differences (color differences) of L*a*b* values of measurement values of 256 gradations so that differences of L*a*b* values between patches become uniform. A correction value is determined for gradations over the respective patches by using linear interpolation; however, there is a problem in increasing an interpolation error and reducing color calibration accuracy depending on the characteristics of a color represented by each ink. This problem will be described using FIGS. 5A, 5B, and 5C.

Figure 5A:
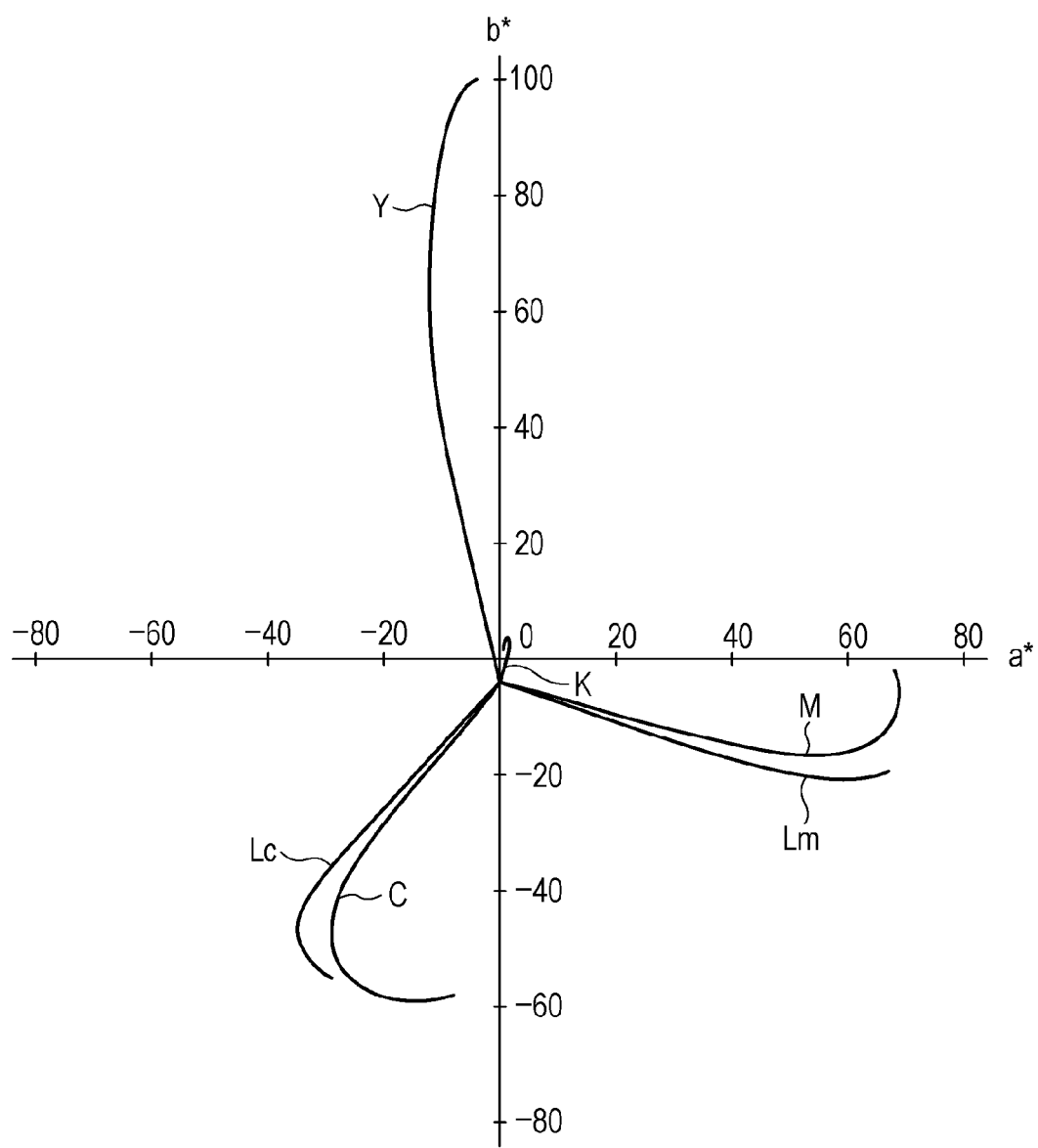
FIG. 5A is a diagram illustrating an example of measurement values in an L*a*b* color space for each ink color.
Figure 5B:
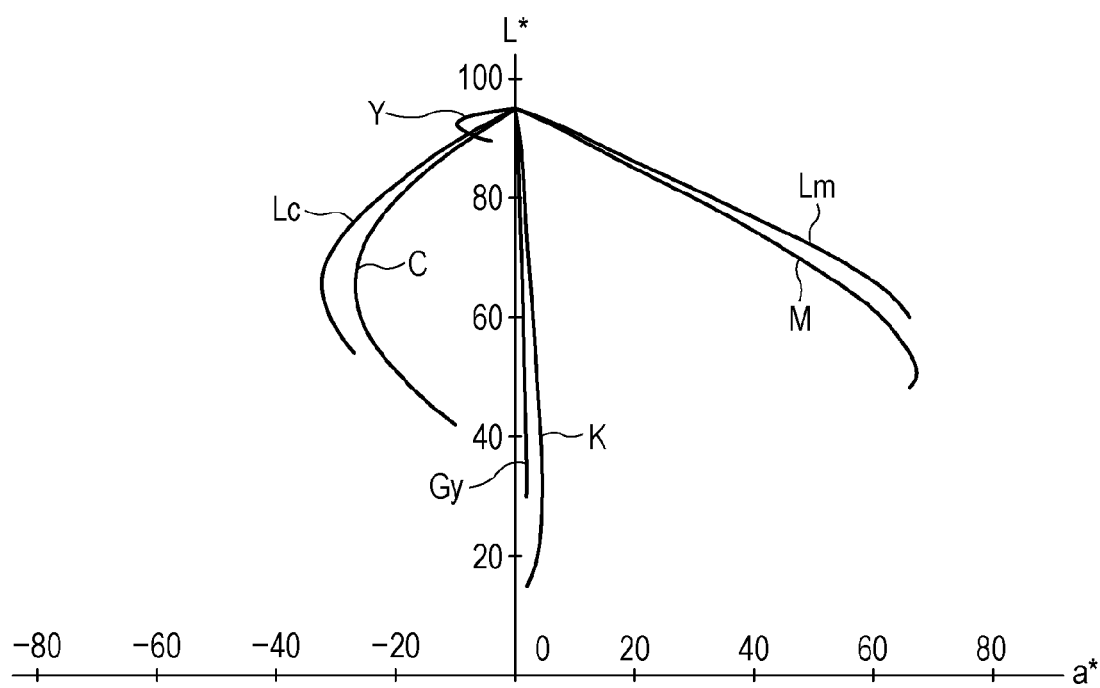
FIG. 5B is a diagram illustrating an example of measurement values in an L*a*b* color space for each ink color.
Figure 5C:
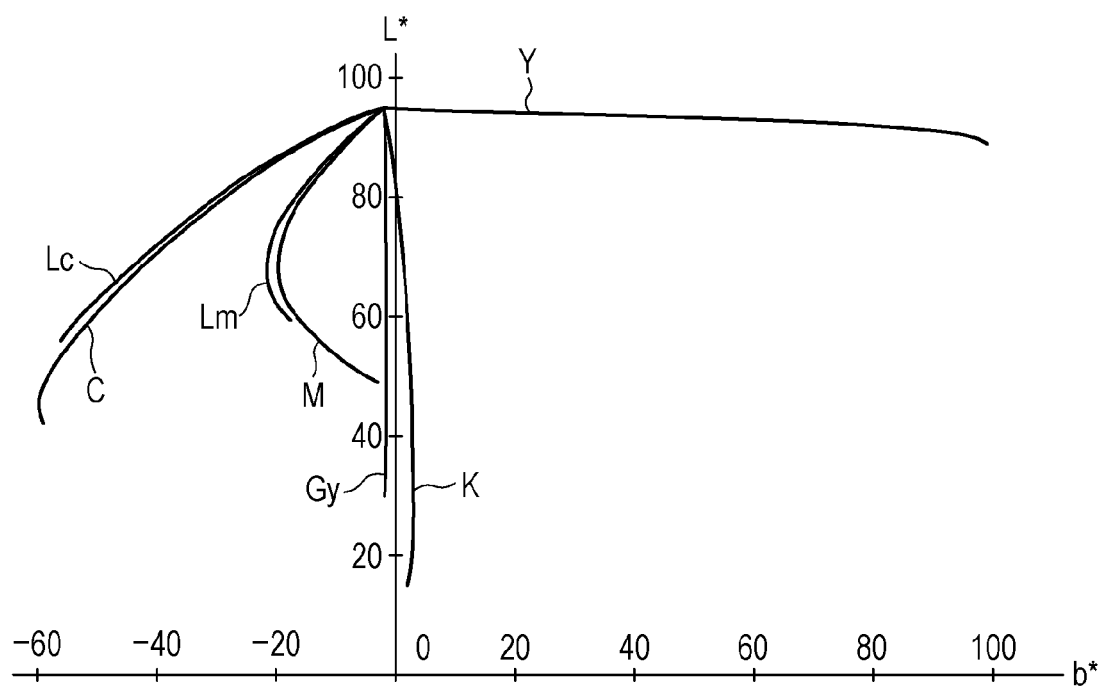
FIG. 5C is a diagram illustrating an example of measurement values in an L*a*b* color space for each ink color.

FIGS. 5A to 5C are graphs in which measurement values on a recording material recorded using the respective ink colors are mapped to a CIE L*a*b* color space and the respective values are connected. FIG. 5A is a diagram illustrating mapping of the respective measurement values to the a*b* plane, FIG. 5B is a diagram illustrating mapping of the respective measurement values to the a*L* plane, and FIG. 5C is a diagram illustrating mapping of the respective measurement values to the b*L* plane. The graph for the respective ink colors shows a trajectory in which the larger the amount of ink to be given per unit region, the lower the L* value. In FIGS. 5B and 5C, therefore, since the L* axis is plotted in the vertical direction in the drawings, the amount of ink given increases from the top to the bottom in the graphs for the respective ink colors. That is, the upper parts of the graphs represent low gradations, and the lower parts of the graphs represent high gradations.

Here, in the graph in which the measurement values for cyan ink (C) are connected, it is found that the trajectory of measurement values in the L*a*b* color space is a large curve in a region having high gradation values, that is, in a region where the amount of ink given per unit region is large. If an ink color having the curving trajectory of measurement values is calibrated using the above-described method described in PTL 1, a region with a large curve exhibits large changes in hue, leading to a large interpolation error between patches.

In the claimed invention, in contrast, a gradation value of each patch is selected so that a larger number of patches are recorded in a region where the changes in hue are large and where an interpolation error is likely to occur. Therefore, it is possible to reduce interpolation errors even when the number of patches is small.

Figure 3:
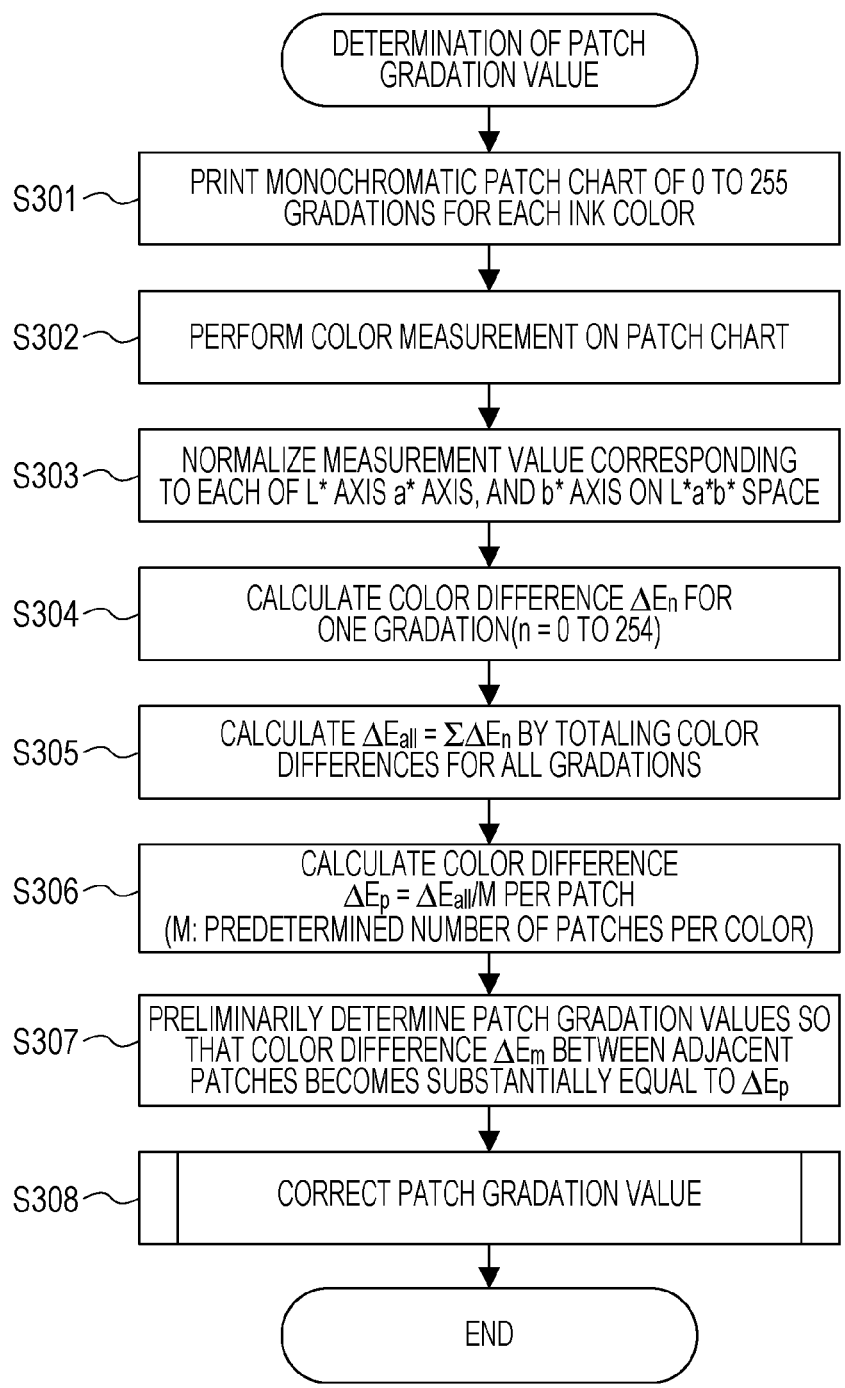
FIG. 3 is a diagram illustrating a flow of processing for determining patch gradation values.

FIG. 3 is a flow of processing for determining a gradation value of each patch in the claimed invention. First, in the process of steps S301 to S307, patch gradation values are preliminarily determined from among 256 gradations of 0 to 255 so that color differences (ΔE) between adjacent patches become uniform. Then, in step S308, the preliminarily determined gradation values are modified to determine gradation values of calibration patches. The details of the processing of S308 will be described using FIG. 7. The flow of the processing will be described hereinafter with reference to FIGS. 3 and 7.

S301: Printing of Monochromatic Patch Chart

First, in step S301, a patch chart including 256 patches corresponding to colors of 256 gradations (0 to 255) of each ink color is printed. Here, a patch chart of 256 gradations for each of seven ink colors, cyan (C), magenta (M), yellow (Y), black (K), light cyan (Lc), light magenta (Lm), and gray (Gy), is printed on a recording medium.

S302: Color Measurement of Patch Chart

Next, in step S302, the patch chart of 256 gradations for each color is subjected to color measurement using the colorimeter 12, and measurement values of patches corresponding to the respective gradation values are obtained.

Figure 4:
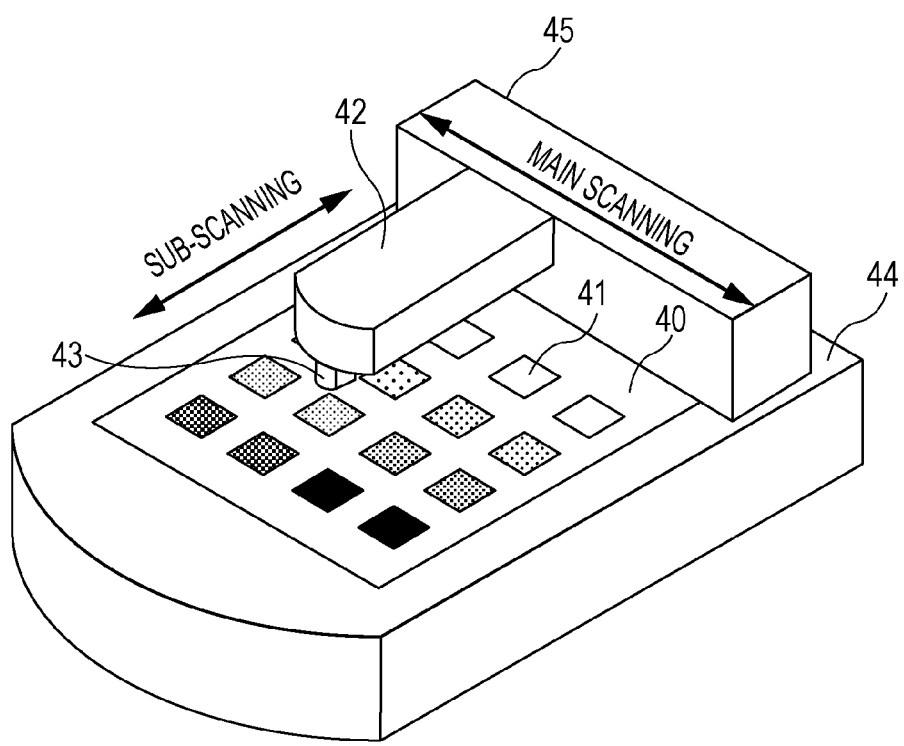
FIG. 4 is a diagram illustrating how a patch chart is measured using a colorimeter.

FIG. 4 is a diagram illustrating how the patch chart is subjected to color measurement using the colorimeter 12. Reference numeral 40 denotes a printed patch chart, reference numeral 41 denotes a patch, reference numeral 42 denotes a colorimeter carriage, reference numeral 43 denotes a measurement head, reference numeral 44 denotes a stage, and reference numeral 45 denotes a rail. The colorimeter carriage 42 having the measurement head 43 attached thereto moves in the main scanning direction along the rail 45, and the rail 45 moves in the sub-scanning direction over the stage 44. The color measurement of the patches is performed by the measurement head 43, and measurement values on a CIE-L*a*b* color space that is a uniform-color color space independent of devices are obtained. In this case, variations in measurement value may occur due to a difference in position on the surface of the recording medium, fluctuation of ink droplets when ejected, etc. To address such variations, preferably, the measurement values are smoothed (smoothing processing) using moving average or any other method after the measurement values are obtained.

Next, a description will be given of the process of steps S303 to S307, in which a gradation value of each patch in a calibration patch chart is preliminarily determined from among 256 gradations of 0 to 255. FIG. 6 is a table illustrating measurement values of patches of 256 gradations which are recorded using cyan ink, and values calculated, based on the measurement values, during the process of preliminarily determining ΔE uniform patches having uniform distances (color differences) in the CIE-L*a*b* color space.

S303: Normalization of Measurement Values

In step S303, normalization processing of the measurement values is performed. The normalization processing is processing for converting measurement values on the L*a*b* color space which correspond to the respective gradations of 0 to 255 so that the minimum value becomes 0 and the maximum value becomes 1 on each of the L* axis, the a* axis, and the b* axis. That is, a maximum value of the L* values, a maximum value of the a* values, and a maximum value of the b* values are determined for the respective measurement values of 256 gradations, and the respective values are converted so that the maximum value on each axis becomes 1. Through the conversion of the L*, a*, and b* values so that the respective values become values between 0 and 1, the respective measurement values become values included in a cube whose one side has a length of 1. In FIG. 6, the L* column, the a* column, and the b* column represent measurement values obtained before the normalization processing, and the L*' column, the a*' column, and the b*' column represent values obtained after the normalization processing.

Patch gradation values may be determined through subsequent processing without executing the normalization processing. However, an interpolation error is more likely to occur for, particularly, achromatic colors of ink such as black ink (K) and gray ink (Gy) than for chromatic colors of ink. Thus, preferably, normalization processing is executed. The reasons for this will be described in detail hereinafter.

In FIGS. 5A to 5C, graphs obtained by connecting measurement values of achromatic colors of ink such as K and Gy exhibit large changes in L* value and very small changes in a* value and b* value. In a high-density portion, however, the changes in L* value are very small, and the ratio of changes in a* value and b* value to changes in L* value is high. For this reason, if a patch gradation value of each patch is preliminarily determined so that the color differences ΔE become uniform in subsequent processing, the variation width of gradation values in a high-gradation portion (high-density portion) becomes very large, resulting in an increase in interpolation error in the high-density portion.

Figure 15:
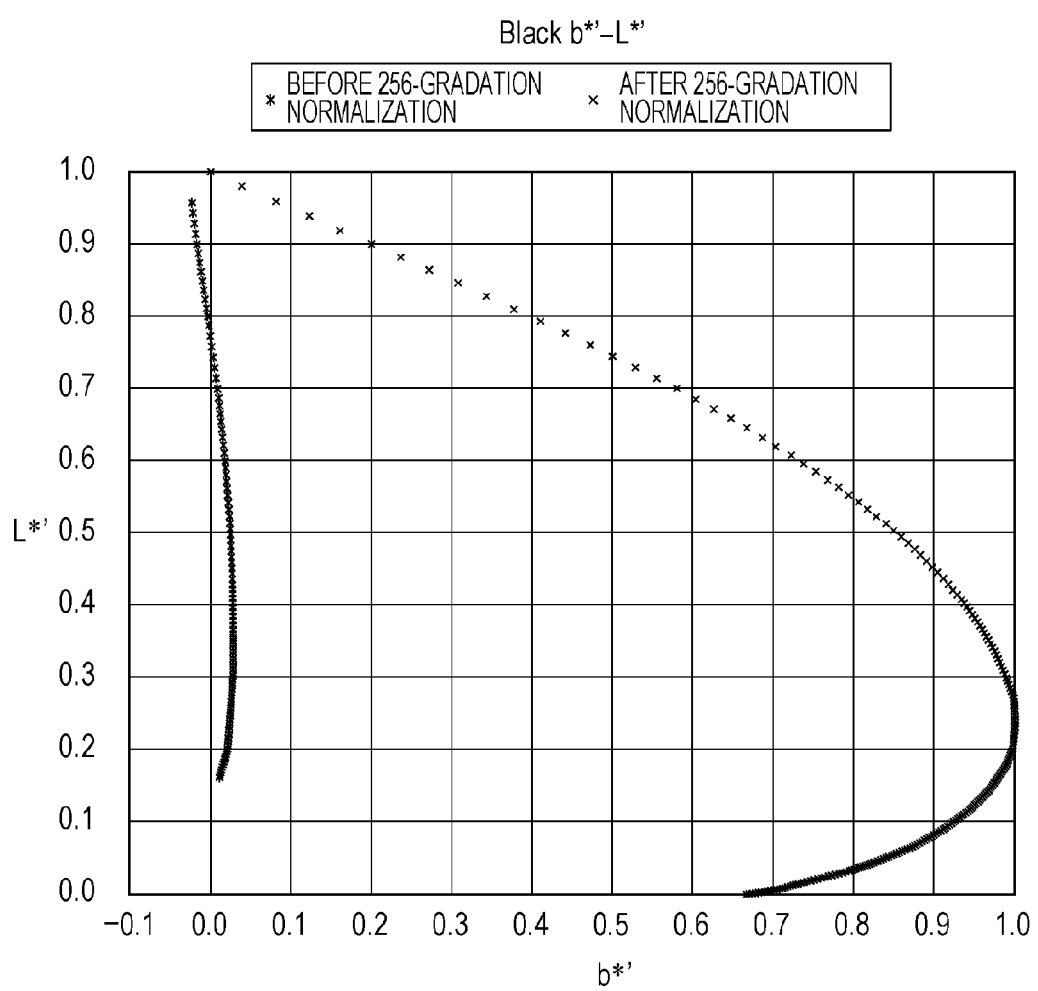
FIG. 15 is a diagram depicting normalization processing to be performed on measurement values for black ink.

Here, FIG. 15 is a diagram depicting normalization processing of black ink (K). Two graphs are a graph (before 256-gradation normalization) obtained by, as in FIG. 5C, connecting measurement values of 256 gradations which are mapped to the b*L* plane, and its normalized graph (after 256-gradation normalization). It is found from the graph obtained before normalization that a color difference between gradations is very small in the high-gradation portion (lower portion in FIG. 15). Therefore, if patch gradation values are selected so that the color differences ΔE become uniform without performing normalization processing, the intervals between patches is large even though fine measurement values need to be taken in the high-gradation portion. Thus, calibration accuracy may be reduced. In contrast, normalization processing is performed so that a value less than or equal to 1 is obtained on each axis, thus allowing the intervals in the high-gradation portion (lower part of FIG. 15) to be increased in the manner illustrated in the drawing. Patch gradation values having uniform color differences are selected using measurement values obtained after normalization processing. Thus, the number of patches in the high-gradation portion can be increased.

In this embodiment, normalization processing is performed for all the ink colors. However, as described above, normalization processing may be performed only for measurement values of achromatic colors of ink such as K and Gy where an interpolation error is more likely to occur.

The normalization processing is processing performed to appropriately select M patch gradation values in a calibration chart from among 256 gradations of 0 to 255, and is not performed when calibration is actually executed. In the processing of step S303 and the subsequent steps, the values obtained by performing normalization processing on the measurement values obtained in S302 are referred to as "measurement values". Actually, however, when a calibration chart is recorded, patches are recorded using the values obtained before normalization processing, that is, using the measurement values obtained through color measurement in step S302.

S304: Calculation of Color Difference $\Delta E_n$ Between Gradations

In step S304, a color difference $\Delta E_n$ of one gradation in the chart of 256 gradations is calculated. Assuming that L*, a*, and b* when a gradation value is represented by n (n=0 to 254) are represented by $L_n^*$, $a_n^*$, and $b_n^*$, respectively, $\Delta E_n$ can be calculated as given in the following Expression 1 (see the "$\Delta E_n$" column in FIG. 6).

$$\Delta E_n = \sqrt{(L_{n+1}^* - L_n^*)^2 + (a_{n+1}^* - a_n^*)^2 + (b_{n+1}^* - b_n^*)^2} \qquad \text{(Expression 1)}$$

S305: Calculation of $\Delta E_{all}$ by Totaling Color Differences Over all Gradations In step S305, color differences over the respective gradations for 256 gradations are totaled using Expression 2 to calculate the sum $\Delta E_{all}$. In the example in FIG. 6, $\Delta E_{all} = 2.248$.

$$\Delta E_{all} = \sum_{254}^{n=0} \Delta E_n \qquad \text{(Expression 2)}$$

S306: Calculation of Color Difference $\Delta E_p$ Between Adjacent Gradations

In step S306, a color difference per patch for calibration patches, that is, a color difference $\Delta E_p$ between adjacent gradations different by one gradation, is calculated. If the predetermined number of patches per ink color is represented by M, $\Delta E_p$ can be calculated using the following Expression 3. In this embodiment, it is assumed that M=16. In the example in FIG. 6, $\Delta E_p = 0.150$.

$$\Delta E_p = \frac{\Delta E_{all}}{M} \qquad \text{(Expression 3)}$$

S307: Preliminary Determination of Patch Gradation Values

In step S307, patch gradation values are preliminarily determined so that a color difference $\Delta E_m$ (m=0 to M−1) between adjacent patches becomes substantially equal to $\Delta E_p$. The gradation value 0 is fixed to represent the first patch, and the gradation value of 255 is fixed to represent the 16th patch. In the "uniform patch" column in FIG. 6, patch numbers of preliminarily determined patches are illustrated in sequence.

In this embodiment, a method is used in which $\Delta E_m$ is incremented in the direction in which the gradation values increase, starting from the gradation value 0, and when the resulting value exceeds $\Delta E_p = 0.150$, the current gradation value is selected as the next patch gradation value. As long as a method capable of preliminarily determining patch gradation values so that the patch gradation values become substantially uniform is used, $\Delta E_p$ may be incremented in the direction in which the gradation values decrease, starting from gradation value of 255, and when $\Delta E_p$ exceeds $\Delta E_p$=0.150, the current gradation value may be selected as the next patch. Alternatively, the selection may be made using any other method. In this way, M (in this embodiment, 16) values of 0, 2, 5, 8, ... 255 are selected from among 256 gradations as patch gradation values of uniform patches so that color differences become substantially equal to each other, and are preliminarily determined.

S308: Modification of Patch Gradation Values

In step S308, the gradation values are modified (changed) based on the $\Delta E$ uniform patches determined in step S307.

Figure 7:
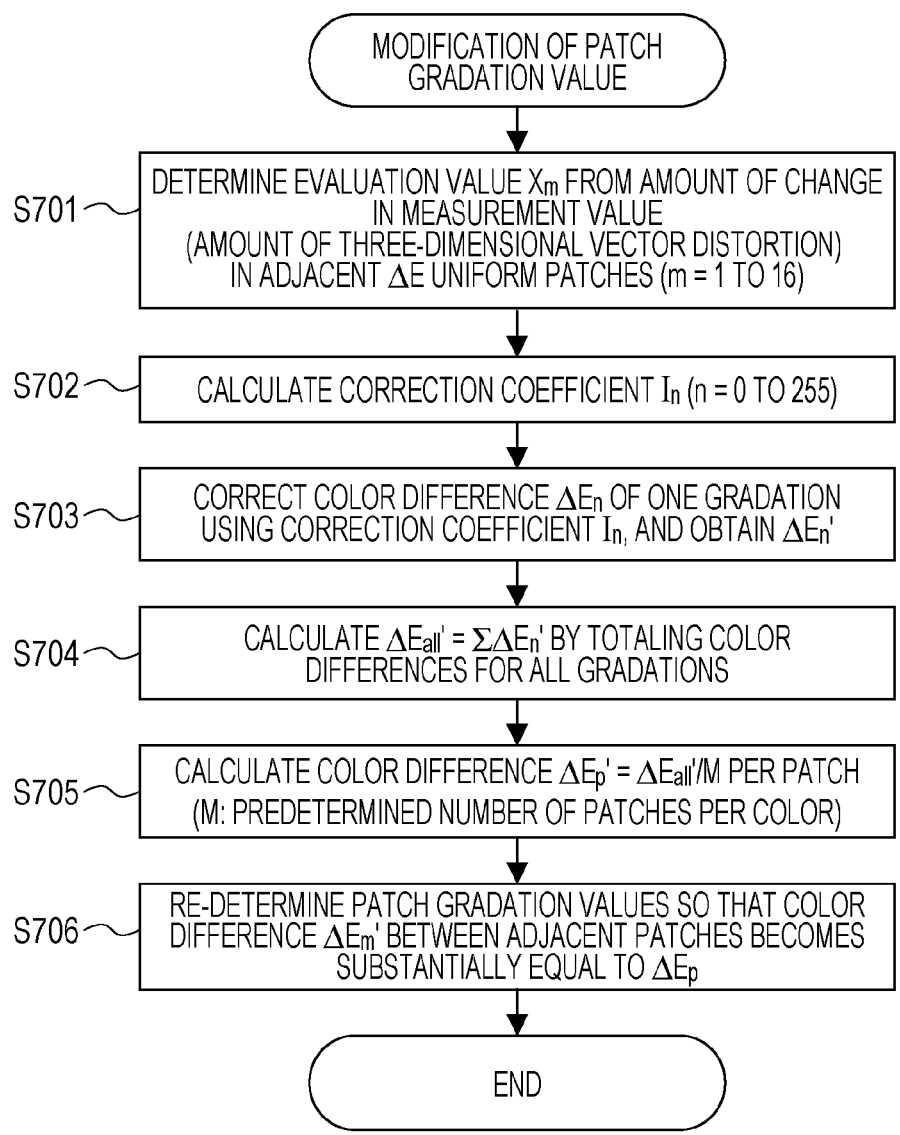
FIG. 7 is a diagram illustrating a flow of processing for modifying preliminarily determined patch gradation values and determining patch gradation values.

FIG. 7 is an illustration of a flow of processing for determining new patch gradation values on the basis of the preliminarily determined patch gradation values. The flow of the processing will be described hereinafter using FIG. 7.

S701: Calculation of Evaluation Value

In step S701, an amount of change in measurement value over adjacent $\Delta E$ uniform patches (this will be referred to as an amount of distortion) is determined on the basis of the M patch gradation values preliminarily determined in step S307, and an evaluation value $X_m$ (m=1 to 16), which is a feature value, is further determined.

Figure 8A:
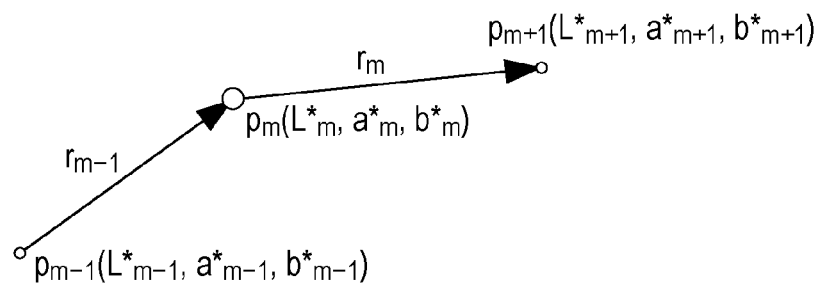
FIG. 8A is a diagram depicting a flow in which an evaluation value $X_m$ is calculated from three measurement values.
Figure 8B:
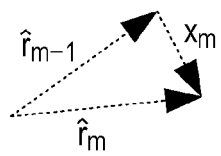
FIG. 8B is a diagram depicting a flow in which an evaluation value $X_m$ is calculated from three measurement values.

FIGS. 8A and 8B are diagrams depicting a flow in which an evaluation value $X_m$ is calculated on the basis of measurement values corresponding to three adjacent patch gradation values among M patch gradation values. FIG. 8A is a diagram illustrating vectors of measurement values corresponding to three consecutive $\Delta E$ uniform patches to determine an amount of change, and FIG. 8B is a diagram illustrating a relationship between unit vectors and a difference vector $x_m$.

First, as illustrated in FIG. 8A, vectors of measurement values corresponding to three consecutive gradation values (first gradation, second gradation, and third gradation) among M measurement values of $\Delta E$ uniform patches with respect to the origin of the measurement color space (CIE-L*a*b* space) are determined. It is assumed that the vector corresponding to the first gradation is represented by $p_{m-1}(L_{m-1}^*, a_{m-1}^*, b_{m-1}^*)$, the vector corresponding to the second gradation is represented by $p_m(L_m^*, a_m^*, b_m^*)$, and the vector corresponding to the third gradation is represented by $p_{m+1}(L_{m+1}^*, a_{m+1}^*, b_{m+1}^*)$ (m=2 to 15). Next, a vector $r_{m-1}$ (first vector) and a vector $r_m$ (second vector) are determined using (Expression 4) and (Expression 5). Next, a unit vector is determined for each of the vector $r_{m-1}$ and the vector $r_m$. Then, as illustrated in FIG. 8B, a difference vector $x_m$ between the unit vectors is determined using (Expression 6), and the magnitude (absolute value) of the difference vector $x_m$ is defined as an amount of distortion $X_m$ using (Expression 7). In this case, the reason that unit vectors are determined for the vector $r_{m-1}$ and the vector $r_m$ is that as an angle defined between two vectors increases, the absolute value (amount of distortion) is increased, regardless of the magnitude of each vector. In this embodiment, the number of data sets is not sufficient at both ends (m=1, m=M=16) of the $\Delta E$ uniform patches to calculate an amount of distortion. Thus, it is assumed that $X_1$=0 and $X_{16}$=$X_{15}$.

$$r_{m-1} = p_m - p_{m-1} \quad \text{(Expression 4)}$$

$$r_m = p_{m+1} - p_m \quad \text{(Expression 5)}$$

$$x_m = \hat{r}_m - \hat{r}_{m-1} \quad \text{(Expression 6)}$$

$$x_m = |x_m| \quad \text{(Expression 7)}$$

Here, FIG. 9 is a diagram illustrating values calculated during the process of determining a correction coefficient $I_n$ from a measurement value of a $\Delta E$ uniform patch for cyan ink (C). Results of calculating amounts of distortion $X_1$ are shown in the "amount of distortion $X_m$" column.

S702: Calculation of Correction Coefficient $I_n$

In step S702, correction coefficients $I_n$ (n=0 to 255) corresponding to the 256 gradations of 0 to 255 are calculated based on the evaluation value $X_m$ calculated in step S701. First, correction coefficients $I_n$ for gradation values n=0, 2, 5, ..., 151, 192, and 255 obtained before modification for $\Delta E$ uniform patches (m=1 to 16) are determined using the following (Expression 8).

$$I_n = \alpha \times X_m + 1 \quad \text{(Expression 8)}$$

$\alpha$ denotes a coarseness factor for determining the degree of coarseness, and is set to a value greater than or equal to 1. In this embodiment, it is assumed that $\alpha$=3. The values of correction coefficients $I_n$ for 16 $\Delta E$ uniform patches are shown in the "coefficient $I_n$" column in FIG. 9. After correction coefficients for the gradations of the $\Delta E$ uniform patches are calculated, correction coefficients $I_n$ for gradations other than the above-described gradation values are calculated for n=0 to 255, using linear interpolation, spline interpolation, or the like.

Figure 10:
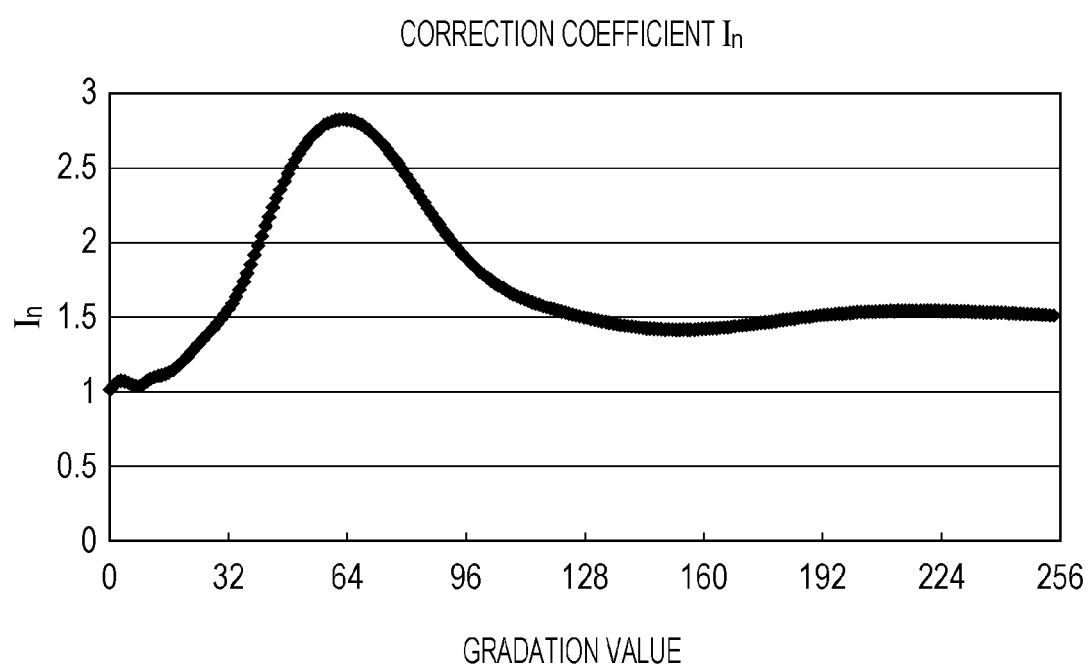
FIG. 10 is a diagram illustrating changes in the values of correction coefficients $I_n$ with respect to gradation values.

FIG. 10 is a diagram illustrating changes in the values of the correction coefficients $I_n$ with respect to gradation values for C ink. A correction coefficient around the gradation value of 64 at which the measurement values largely change non-linearly becomes maximum. That is, correction coefficients are large in a region around a gradation value having a relatively large absolute value in the 256 gradations, that is, a region where the changes in hue are large.

S703: Calculation of Color Difference $\Delta E_n'$ Between Adjacent Gradations

In step S703, the color difference $\Delta E_n$ of a measurement value of one gradation in the 256-gradation chart calculated in step S305 is multiplied by the correction coefficient $I_n$ using (Expression 9), and 256 color differences $\Delta E_n'$ for one gradation, which correspond to the 256 gradations, are obtained as correction values.

$$\Delta E_n' = \Delta E_n \times I_n \quad \text{(Expression 9)}$$

FIG. 11 illustrates values calculated during the process of determining a patch to be modified. Results of calculating $\Delta E_n'$ are shown in the "color difference $\Delta E_n'$" column in FIG. 11. As illustrated in FIG. 10, the correction coefficient $I_n$ has a maximum value at the gradation value of 64. That is, the more largely the orientation of a vector between gradations changes, that is, the larger the amount of distortion is, the larger the correction coefficient is set.

S704: Calculation of $\Delta E_{all}'$ by Totaling Color Differences for all Gradations In step S704, color differences for the 256 gradations are totaled using (Expression 10) to calculate the sum $\Delta E_{all}'$. In the example in FIG. 11, it is assumed that $\Delta E_{all}'$=3.343.

$$\Delta E_{all}' = \sum_{254}^{n=0} \Delta E_n' \quad \text{(Expression 10)}$$

S705: Calculation of Color Difference $\Delta E_p'$ Per Patch

In step S705, a color difference $\Delta E_p'$ per patch is calculated using (Expression 11). If the predetermined number of patches per ink color is represented by M, $\Delta E_p'$ can be expressed as follows. In the example in FIG. 11, $\Delta E_p'$=0.223.

$$\Delta E'_p = \frac{\Delta E'_{all}}{M} \quad \text{(Expression 11)}$$

S706: Re-Determination of Patch Gradation Values

In step S706, as in step S307, patch gradation values are determined so that a color difference $\Delta E_m'$ (m=1 to M) between adjacent patches becomes substantially equal to $\Delta E_p'$.

The patch numbers of the determined patches are shown in the "patch to be modified" column in FIG. 11. In the example in FIG. 11, gradation values 0, 3, 7 . . . 151, 193, and 255 are determined as gradation values for patches to be modified, that is, patches to be printed on a patch chart during calibration. FIG. 12 illustrates gradation values obtained after modification, which are finally determined, and measurement values (L*a*b* values) obtained before normalization processing, which correspond to the gradation values.

When step S706 is completed, the entire processing ends.

Figure 13A:
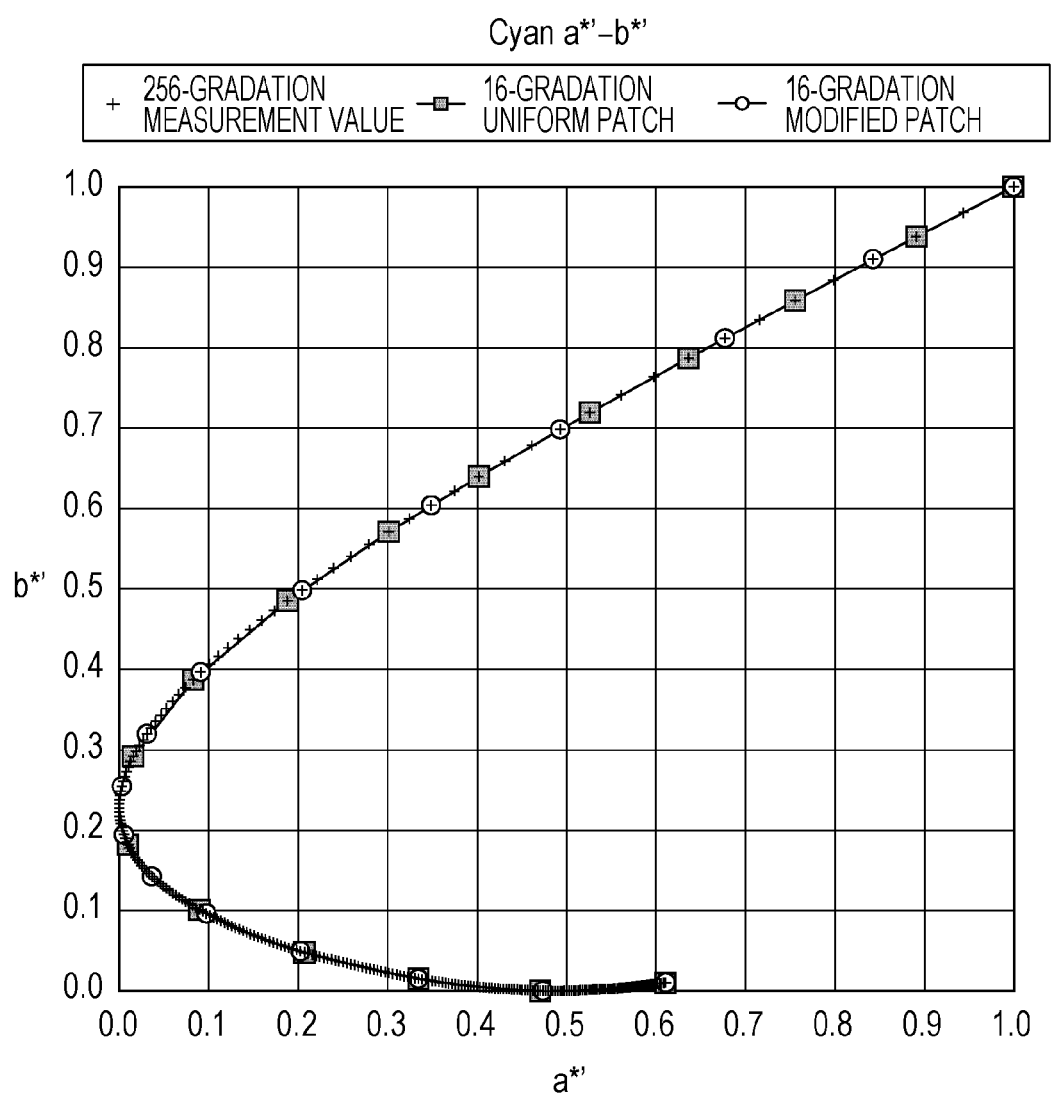
FIG. 13A is a diagram illustrating an example in which measurement values for 256 gradations, ΔE uniform patches, and modified patches are mapped to the a*b* plane.
Figure 13B:
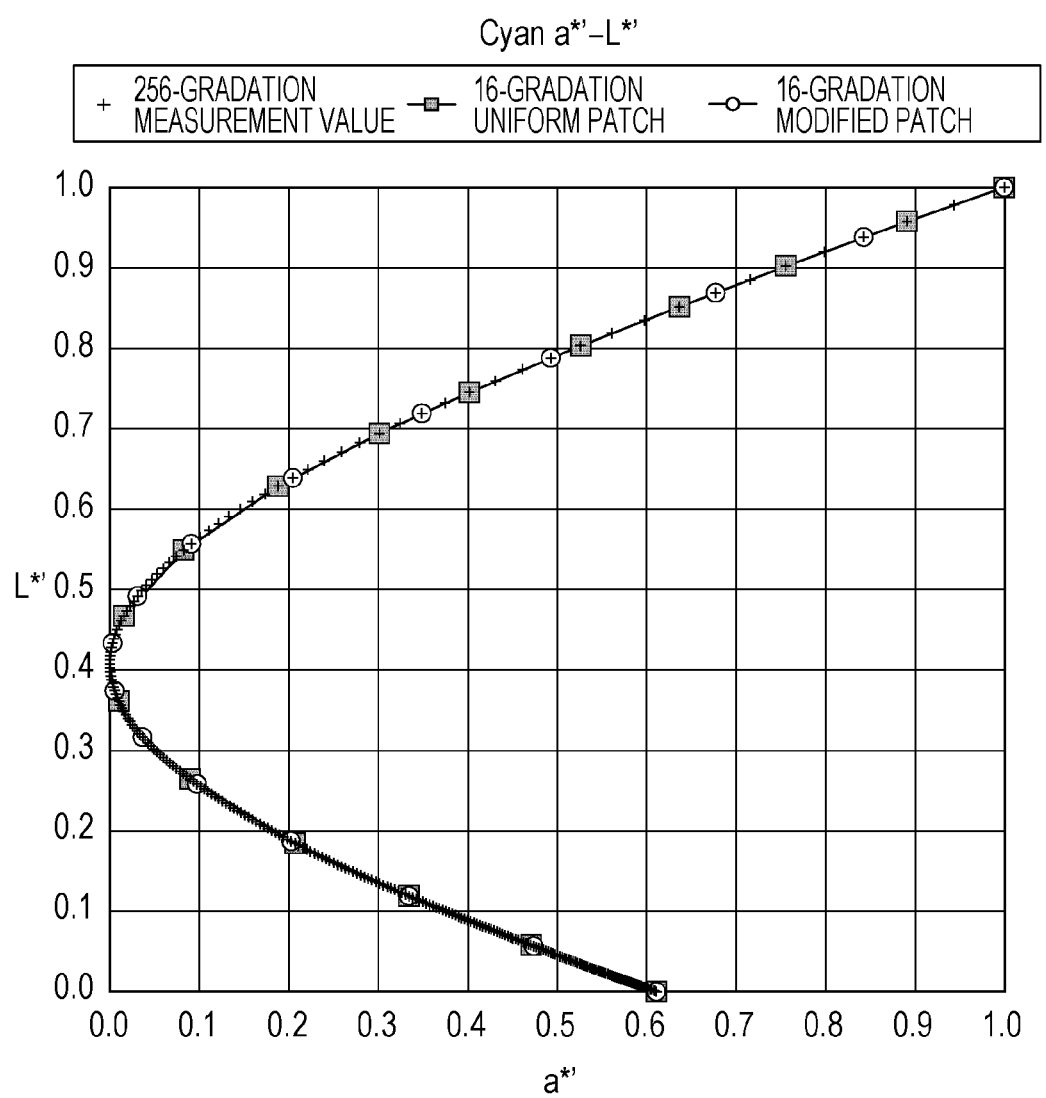
FIG. 13B is a diagram illustrating an example in which measurement values for 256 gradations, ΔE uniform patches, and modified patches are mapped to the a*L* plane.
Figure 13C:
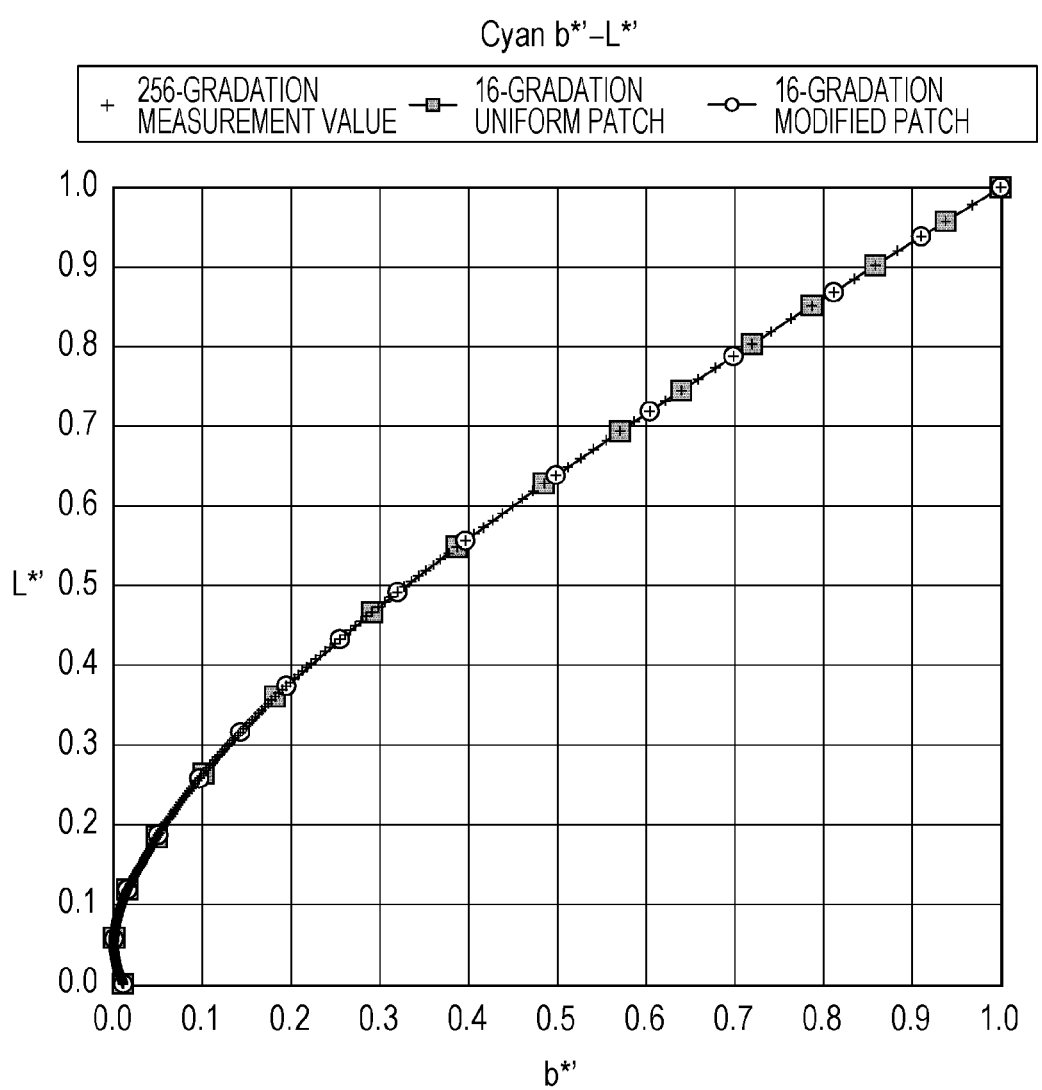
FIG. 13C is a diagram illustrating an example in which measurement values for 256 gradations, ΔE uniform patches, and modified patches are mapped to the b*L* plane.

FIGS. 13A to 13C are graphs illustrating measurement values corresponding to gradation values of 256 gradations when the number of patches M for cyan ink is 16, measurement values corresponding to 16 preliminarily determined gradation values, and finally determined measurement values. In the graphs, specifically, + in the drawings represents measurement values for 256 gradations obtained after normalization processing, black rectangles in the drawings represent preliminarily determined measurement values corresponding to ΔE uniform patches, and white circles in the drawings represent measurement values of 16 patches obtained after modification, which are mapped to each of the a*b* plane, the a*L* plane, and the b*L* plane. Comparing the arrangement of the black circles representing preliminarily determined gradation values of ΔE uniformity with that of the white circles representing the gradation values obtained after the gradation values of the ΔE uniformity are modified, it can be found that, for the measurement values obtained after modification, patches are closely arranged in a region where the graphs largely curve. That is, after modification, patches are more closely arranged in a non-linear region than before modification. Thus, interpolation errors can be reduced.

Figure 16A:
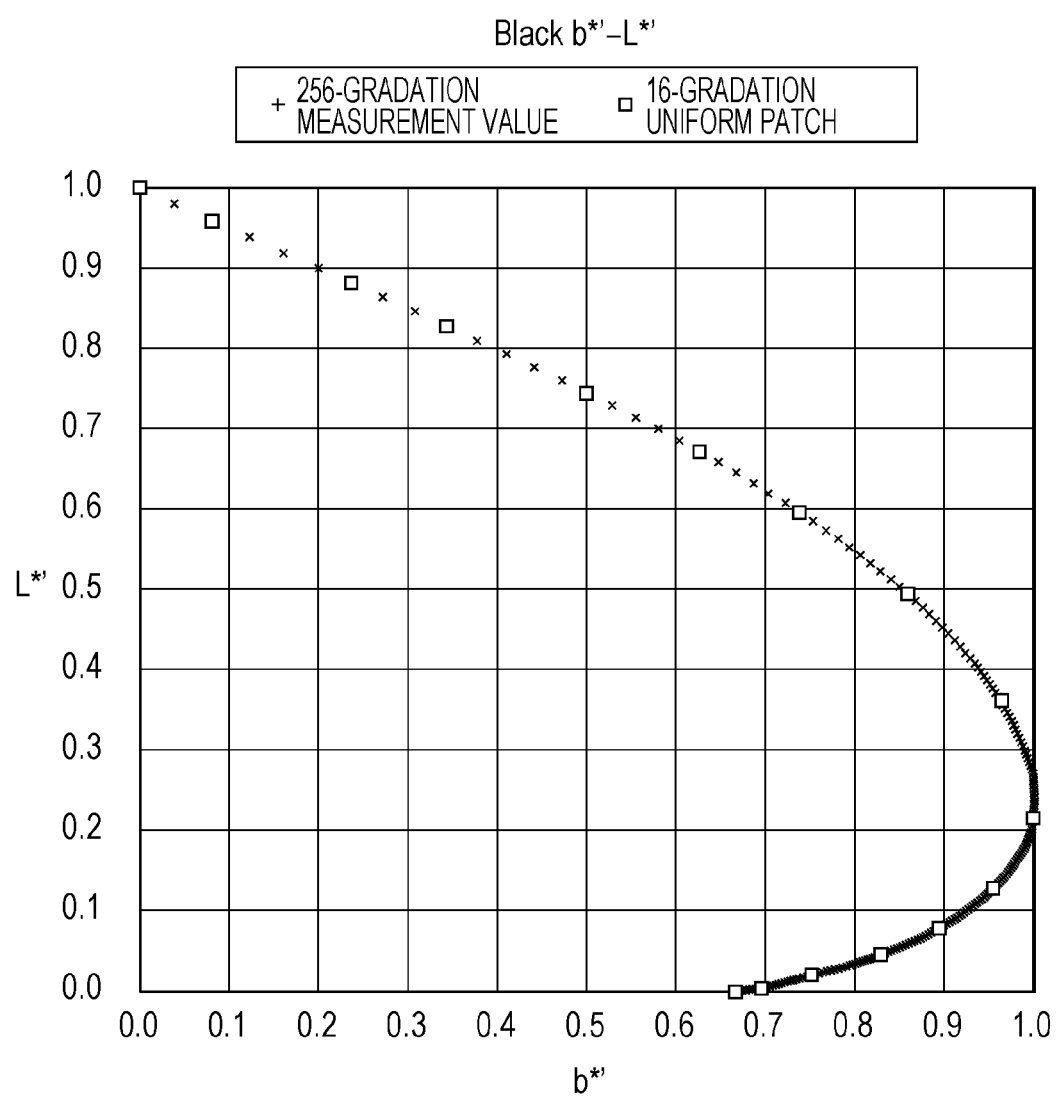
FIG. 16A is a diagram depicting a comparative example for black ink.
Figure 16B:
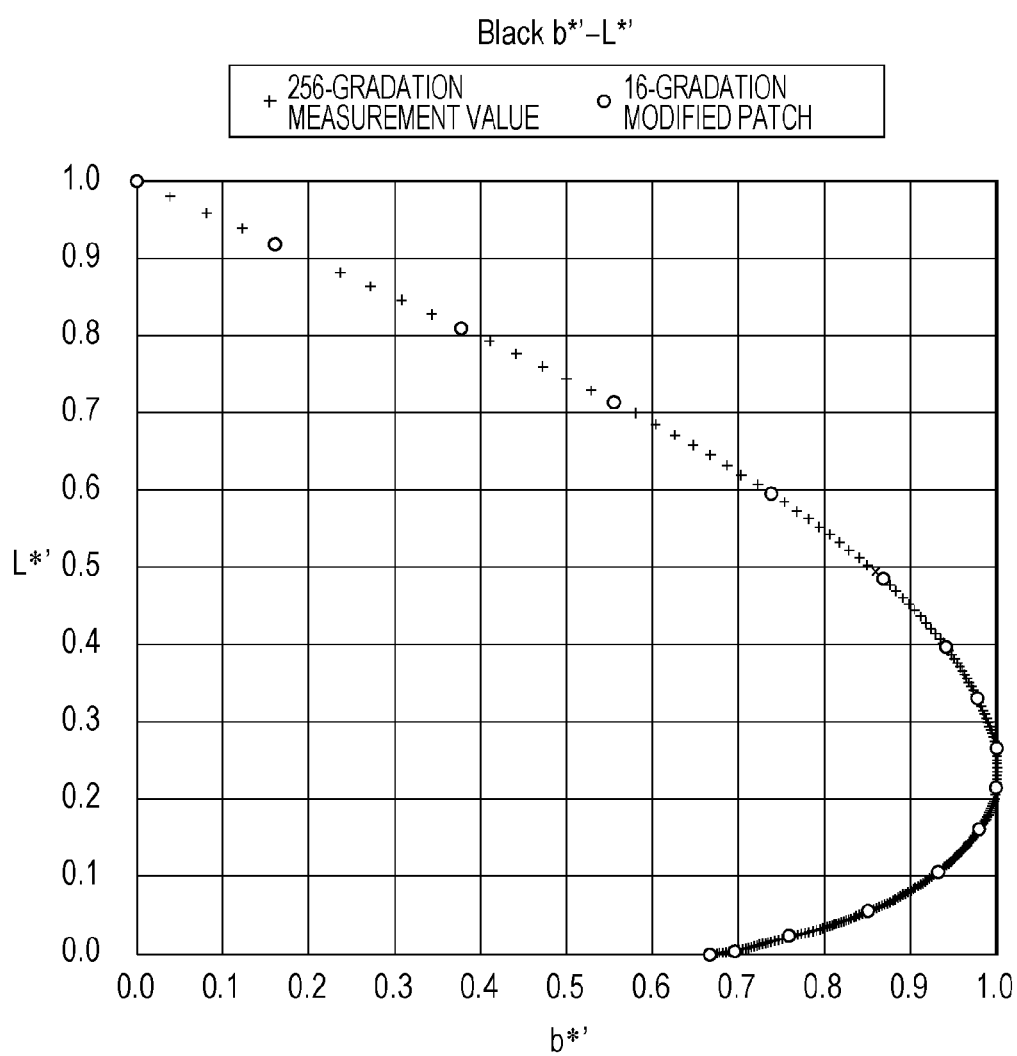
FIG. 16B is a diagram depicting the present invention for black ink.

Similarly, FIGS. 16A and 16B are graphs depicting the above-described processing of this embodiment for black ink, in which L* values are plotted on the vertical axis and b* values are plotted on the horizontal axis. FIG. 16A is a graph of a comparative example, which illustrates measurement values (represented by + in the drawing) corresponding to gradation values of 256 gradations and gradation values (represented by □ in the drawing) of 16 patches preliminarily determined in step S307 so that color differences become uniform. In contrast, FIG. 16B is a graph of this embodiment, which illustrates measurement values (represented by + in the drawing) corresponding to gradation values of 256 gradations and gradation values (represented by ○ in the drawing) of 16 patches to be modified which have been determined by executing the processing of step S308, that is, the processing of steps S701 to S706 in FIG. 7. When FIGS. 16A and 16B are compared, it is found that the processing of step S308 in this embodiment is applied to select 16 gradation values so that patches are closely arranged in a region where gradation values change non-linearly. For example, in the region where the changes in hue are large, where 0.1≤L*≤0.4 and 0.8≤b*≤1.0, three gradation values of patches are selected in FIG. 16A, whereas, six gradation values of patches are selected in FIG. 16B. In this way, the processing of S308 is applied, thus allowing a larger number of patch gradation values to be selected in a region where the changes in hue are large than when patch gradation values are selected so that color differences become uniform.

Figure 17:
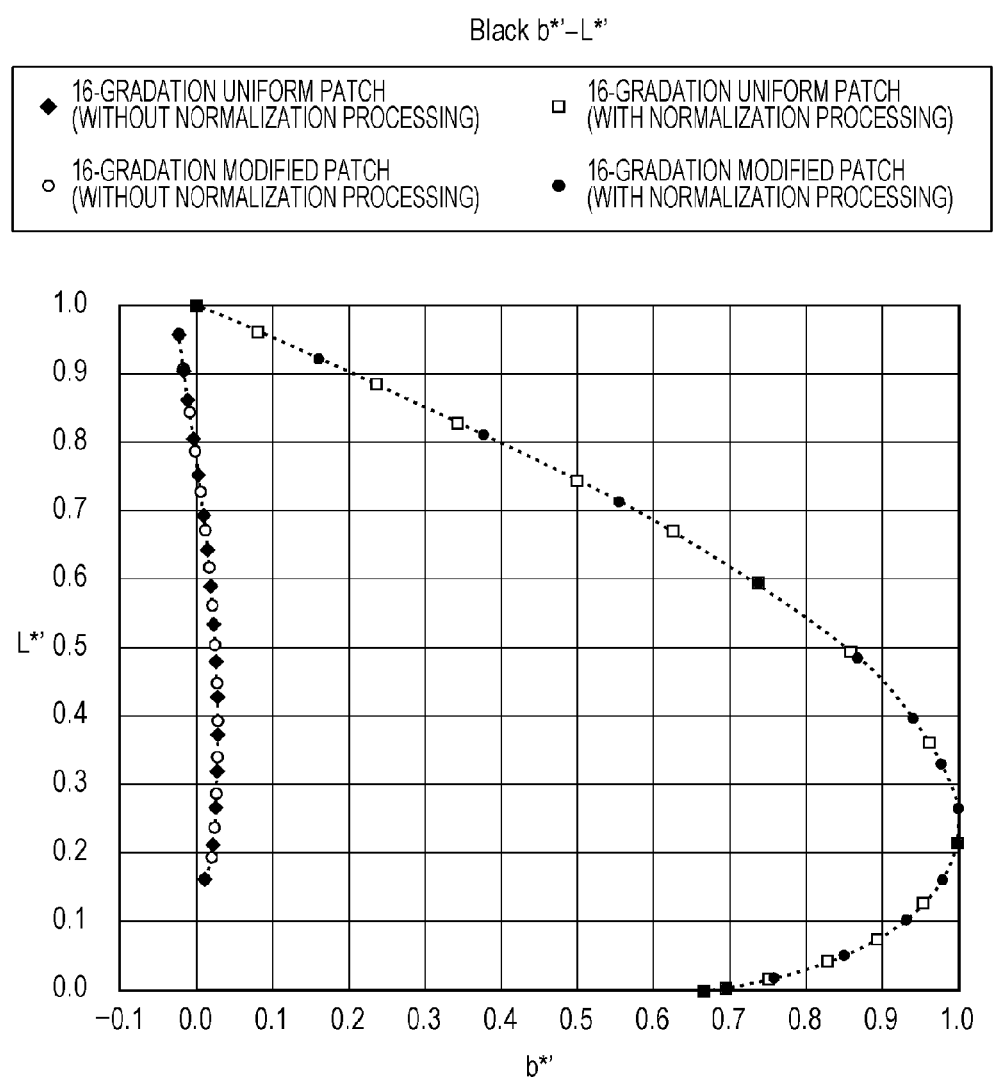
FIG. 17 is a diagram depicting a case where normalization processing is executed and a case where normalization processing is not executed.

In contrast, FIG. 17 is a graph for comparing the case where patch gradation values are determined by the processing of steps S304 to S308 by executing normalization processing in step S303 with the case where patch gradation values are determined by the processing of steps S304 to S308 without executing normalization processing. In FIG. 17, graphs obtained by connecting the measurement values corresponding to the 256 gradations illustrated in FIG. 15 are represented by dotted lines. In FIG. 17, the left line is a graph indicating no normalization processing, and the right line is a graph indicating normalization processing. Each of the graphs illustrates patch gradation values selected so as to provide uniform ΔE, and patch gradation values selected by applying the processing of S308 and modifying ΔE uniform patches. In FIG. 17, in the left line indicating no normalization processing, substantially no changes in interval between a low-gradation portion (for example, L*>0.4) and a high-gradation portion (for example, L*≤0.4) are observed for ΔE uniform patches (represented by black rectangles ♦ in the drawing) and the modified patches (represented by white circles ○ in the drawing). In contrast, in the graph indicating normalization processing, it is found that modified patches (represented by black circles ● in the drawing) have narrower, or closer, patch intervals than ΔE uniform patches (represented by white rectangles □ in the drawing) in a high-gradation portion (for example, L*≤0.4). As indicated in the left line in FIG. 15, L* values do not substantially change if a certain amount or more black ink is supplied. In an experiment made by the present inventors, among 256 gradation values (0 to 255) for black ink, the gradation value 0 to the gradation value of 63 satisfied L*>0.4, and the gradation value of 64 to the gradation value of 255 satisfied L*≤0.4. That is, almost all the gradation values greater than or equal to the gradation value of 64 are present in the region where L* 0.4. For this reason, if patch gradation values are determined without performing normalization processing, patches for black ink are closely present in the region of the gradation value 0 to the gradation value of 63, but are coarse in the region of the gradation value of 64 to the gradation value of 255. In contrast, by performing normalization processing, it is possible to increase the number of patches in a high-gradation portion where the changes in measurement value are very small and L*≤0.4, and to determine patch gradation values so that the patch gradation values can be closely present, thereby improving interpolation accuracy, compared to the case where normalization processing is not performed.

While, in this embodiment, an inkjet printer is taken as a typical example, the present invention is not limited to this, and can also be applied to a copying machine, an electrophotographic printer, and the like.

As described above, an image processing system which adopts a method for determining patch gradation values in color calibration according to the present invention has been described. According to the present invention, patches of 256 gradations are recorded, and, among the patches, a gradation value for each patch in a patch chart, which is used in color calibration, is determined. In this case, gradation values of patches are selected so that the patches are closely arranged in a region where measurement values change non-linearly in accordance with the change in gradation. Therefore, interpolation accuracy can be improved even in a region where measurement values change non-linearly, and appropriate calibration can be performed.

In this embodiment, a description has been given using a method in which, first, patches of 256 gradations are recorded, M patches are selected from among the patches, and M gradation values are determined based on measurement values obtained by subjecting the M patches to color measurement. The present invention is not limited to this, and, for example, patches of N (N is a natural number of 3 or more; in this embodiment, N=256) gradations may be recorded to obtain measurement values, and M gradation value may be determined based on correction values obtained by generating N correction coefficients and by correcting N measurement values. In this embodiment, M gradation values are preliminarily determined from among N gradations before M gradation values are finally determined as gradation values for correction patches. However, the number of gradations to be preliminarily determined (L gradations) and the number of gradations (M gradations) for correction patches to be finally determined may not be the same.

In addition, N correction coefficients may be determined directly from measurement values for recorded patches of N gradations, without preliminarily determining L gradation values. For example, vectors (first vector and second vector) indicating differences between two measurement values which are different by one gradation with respect to three measurement values corresponding to patches of three consecutive gradations among the N gradations may be determined for each of N measurement values. Then, the absolute value of a difference vector between the unit vectors, i.e., the first vector and the second vector, may be calculated, and N correction coefficients may be generated based on the absolute value.

In addition, when gradation values are determined so that color differences between gradations become substantially uniform, the value of each gradation may be determined by interpolation computation. For example, in step S307, a gradation value for which a value obtained by addition becomes $\Delta E_p$ and a measurement value corresponding to the gradation value may be determined by interpolation computation. Further, in this embodiment, in step S301, patches corresponding to 256 gradations are printed. However, the number of gradations is not limited to this. The claimed invention may provide a method for selecting the number of calibration patches M (M: natural number) from among the number of gradations N (N: natural number) obtained in step S301, where N>M.

In this embodiment, furthermore, in step S702, it is assumed that $\alpha=3$ for all the ink colors. However, values different from one ink color to another may be used. If the value of $\alpha$ is set large, the number of patch gradation values to be set in a non-linear region can be large, and measurement values closely arranged in the non-linear region can be obtained. As can be seen from, for example, FIGS. 5A, 5B, and 5C, a graph for cyan ink (C) which is obtained by connecting measurement values exhibits a larger curve than that for light cyan ink (Lc) having a lower color material density than cyan ink. Thus, the value of $\alpha$ to be used for cyan ink (C) may be set larger than the value of $\alpha$ to be used for light cyan ink (Lc) having a lower color material density than cyan ink. This can increase the number of calibration patches in a non-linear region for cyan ink. The same holds true for magenta ink and light magenta ink having a lower color material density than magenta ink.

Further, in the foregoing description of this embodiment, by way of example, Lab values corresponding to a CIE-Lab space that is a uniform color space are acquired as measurement values, and the L values, the a values, and the b values are used as parameters of the measurement values. The present invention is not limited to this, and LUV values in an LUV color space, RGB values, or YCbCr values may be acquired.

The present invention is not intended to be limited to the foregoing embodiments, and a variety of changes and modifications can be made without departing from the spirit and scope of the present invention. Therefore, the claims which follow are appended in order to clearly define the scope of the present invention.

According to the present invention, gradation values of a patch chart used for color calibration are appropriately determined to generate patch chart data, thus enabling execution of high-accuracy calibration with a small interpolation error even when the number of patches is small.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2011/080454, filed Dec. 28, 2011, which is hereby incorporated by reference herein in its entirety.

The invention claimed is:

1. A data generation method for generating patch recording data used to record correction patches corresponding to M (where M is a natural number) gradation values to be used for color calibration, the data generation method comprising:
   a recording step of recording N patches corresponding to densities of N (where N is a natural number and M<N) gradations;
   a first calculating step of calculating a correction coefficient for each of L (where L is a natural number and $3 \leq L \leq N$) gradation values selected from among the N gradations, by using an absolute value of a difference vector between a unit vector of a first vector and a unit vector of a second vector for three consecutive gradations having, in sequence, a first gradation, a second gradation, and a third gradation among the L gradation values, the unit vector of the first vector and the unit vector of the second vector being calculated based on the first vector and the second vector, the first vector representing a difference between a measurement value of the second gradation and a measurement value of the first gradation by using a plurality of parameters, the second vector representing a difference between a measurement value of the third gradation and the measurement value of the second gradation by using the plurality of parameters;
   a second calculating step of calculating a correction coefficient for correcting a measurement value, for each of N measurement values on the basis of the L correction coefficients calculated in the first calculating step;
   a generating step of correcting a color difference of measurement value between gradations of the N gradations by using the N correction coefficients calculated in the second calculating step, and generating N correction values corresponding to the N gradations; and
   a determining step of determining the M gradation values as gradation values for the correction patches from among the N gradations on the basis of the N correction values.

2. The data generation method according to claim 1, wherein the L correction coefficients have larger values as the absolute values corresponding thereto increase.

3. The data generation method according to claim 1, wherein in the determining step, the M gradation values are determined so that sums of correction values for two consecutive gradations are substantially equal to each other.

4. The data generation method according to claim 1, wherein the L gradation values selected from among the N gradations are values selected, by calculating a color difference of two measurement values corresponding to two gradations which are different by one gradation among the N gradations, so that sums of color differences of measurement values between two adjacent gradation values among the L gradation values are substantially equal to each other.

5. The data generation method according to claim 1, wherein the measurement value is a value expressed in a CIE-Lab space that is a uniform color space, the plurality of parameters correspond to L, a, and b, and the color difference represents a distance in the CIE-Lab space.

6. The data generation method according to claim 1, wherein the N correction coefficients have large values for gradations around a corresponding gradation value for which the absolute value is large among the L gradation values, the gradations corresponding to the N gradations, and have small values for gradations around a gradation value for which the absolute value is small, the gradations corresponding to the N gradations.

7. The data generation method according to claim 1, wherein the second calculating step includes calculating the N correction coefficients by performing interpolation computation on the L correction coefficients on the basis of the L gradation values.

8. The data generation method according to claim 1, wherein the N measurement values which are obtained by subjecting the N patches to color measurement are values obtained by normalization processing of the plurality of parameters.

9. The data generation method according to claim 1, wherein the L is a number equal to the M.

10. A data generation apparatus for generating patch recording data used to record correction patches corresponding to M (where M is a natural number) gradation values to be used for color calibration, the data generation apparatus comprising:
a recording means configured to record N patches corresponding to densities of N (where N is a natural number and M<N) gradations;
a measurement means configured to obtain the N measurement values by subjecting the N patches to color measurement;
a first calculating means configured to calculate a correction coefficient for each of L (where L is a natural number and 3≤L≤N) gradation values selected from among the N gradations on the basis of the N measurement values, by using an absolute value of a difference vector between a unit vector of a first vector and a unit vector of a second vector for three consecutive gradations having, in sequence, a first gradation, a second gradation, and a third gradation among the L gradation values, the unit vector of the first vector and the unit vector of the second vector being calculated based on the first vector and the second vector, the first vector representing a difference between a measurement value of the second gradation and a measurement value of the first gradation by using a plurality of parameters, the second vector representing a difference between a measurement value of the third gradation and the measurement value of the second gradation by using the plurality of parameters;
a second calculating means configured to calculate a correction coefficient for correcting a measurement value, for each of N measurement values on the basis of the L correction coefficients calculated by the first calculating means;
a generating means configured to correct a color difference of measurement value between gradations of the N gradations by using the N correction coefficients calculated by the second calculating means, and to generate N correction values corresponding to the N gradations; and
a determining means configured to determine the M gradation values as gradation values for the correction patches from among the N gradations on the basis of the N correction values.

11. A data generation method for generating patch recording data used to record correction patches corresponding to M (where M is a natural number) gradation values to be used for color calibration, the data generation method comprising:
a recording step of recording N patches corresponding to densities of N (where N is a natural number and N>M) gradations;
a calculating step of calculating a correction coefficient for correcting a measurement value, in association with each of N measurement values obtained by subjecting the N patches to color measurement, on the basis of each of the N measurement values;
a generating step of correcting a color difference of measurement value between gradations of the N gradations by using the N correction coefficients calculated in the calculating step, and generating N correction values corresponding to the N gradations; and
a determining step of determining the M gradation values as gradation values for the correction patches from among the N gradations on the basis of the N correction values,
wherein the calculating step calculates each of the N correction coefficients respectively for the N gradations, by using an absolute value of a difference vector between a unit vector of a first vector and a unit vector of a second vector for three consecutive gradations having, in sequence, a first gradation, a second gradation, and a third gradation among the N gradations, the unit vector of the first vector and the unit vector of the second vector being calculated based on the first vector and the second vector, the first vector representing a difference between a measurement value of the second gradation and a measurement value of the first gradation by using a plurality of parameters, the second vector representing a difference between a measurement value of the third gradation and the measurement value of the second gradation by using the plurality of parameters.

* * * * *